(12) United States Patent
Brager et al.

(10) Patent No.: US 11,861,528 B1
(45) Date of Patent: Jan. 2, 2024

(54) INFRINGEMENT DETECTION SYSTEM

(71) Applicant: Perception Partners, Inc., Atlanta, GA (US)

(72) Inventors: Barry Brager, Atlanta, GA (US); Craig Meyer, Wynnewood, PA (US)

(*) Notice: Subject to any disclaimer, the term of this patent is extended or adjusted under 35 U.S.C. 154(b) by 662 days.

(21) Appl. No.: 16/707,702

(22) Filed: Dec. 9, 2019

Related U.S. Application Data

(60) Provisional application No. 62/777,088, filed on Dec. 8, 2018.

(51) Int. Cl.
| | |
|---|---|
| *G06Q 50/18* | (2012.01) |
| *G06N 3/08* | (2023.01) |
| *G06N 3/04* | (2023.01) |
| *G06Q 30/0201* | (2023.01) |

(52) U.S. Cl.
CPC .......... *G06Q 50/184* (2013.01); *G06N 3/04* (2013.01); *G06N 3/08* (2013.01); *G06Q 30/0206* (2013.01)

(58) Field of Classification Search
USPC ......................................................... 705/310
See application file for complete search history.

(56) References Cited

U.S. PATENT DOCUMENTS

| | | | |
|---|---|---|---|
| 8,019,650 | B2 | 9/2011 | Donsbach et al. |
| 8,392,484 | B2 | 3/2013 | Zhou et al. |
| 9,928,448 | B1* | 3/2018 | Merler ............... G06V 20/35 |
| 2005/0210008 | A1* | 9/2005 | Tran ................. G06F 16/951 |

(Continued)

FOREIGN PATENT DOCUMENTS

| | | |
|---|---|---|
| CN | 101630327 | 1/2010 |
| CN | 102024049 | 4/2011 |

(Continued)

OTHER PUBLICATIONS

He, Kaiming and Zhang, Xiangyu and Ren, Shaoqing and Sun, Jian, Deep Residual Learning for Image Recognition, Proceedings of the IEEE Conference on Computer Vision and Pattern Recognition (CVPR), Jun. 2016, 770-778 (Year: 2016).*

(Continued)

*Primary Examiner* — Michael Young
(74) *Attorney, Agent, or Firm* — Hartman & Citrin LLC

(57) ABSTRACT

Concepts and technologies are disclosed herein for an infringement detection system that obtains images of products and images of proprietary objects, and analyzes the images to make coarse matches. An image comparison engine may transform or augment the data for comparison for coarse and refined matching. The outputs of the image comparison engine are initial infringement predictions that are further evaluated using refined matching including shape fitting. The detection system outputs refined infringement predictions, which may be optionally confirmed as counterfeit based on various considerations (e.g., known inauthentic products, suspect sales history, text and image anomalies, etc.). Upon a refined match or confirmation, the detection system records potential infringements and associated metadata into a database to initiate an optional response action. Multiple response actions are possible for transmission over a computer network to one or more receiving electronic addresses, computer servers, network system gateways or mobile/fixed devices.

20 Claims, 10 Drawing Sheets

(56) References Cited

U.S. PATENT DOCUMENTS

| | | | | |
|---|---|---|---|---|
| 2009/0310835 A1* | 12/2009 | Kaus | ........................ | G06T 7/12 |
| | | | | 382/128 |
| 2014/0185875 A1* | 7/2014 | Tsuji | .................... | G06V 40/161 |
| | | | | 382/103 |
| 2014/0279584 A1* | 9/2014 | Lee | ...................... | G06F 3/0481 |
| | | | | 705/310 |
| 2016/0048936 A1* | 2/2016 | Perkowski | ........... | G06Q 10/063 |
| | | | | 705/310 |
| 2016/0148327 A1* | 5/2016 | Buchholz | ............. | G06Q 50/184 |
| | | | | 705/310 |

FOREIGN PATENT DOCUMENTS

| | | | | |
|---|---|---|---|---|
| CN | 104408334 | | 3/2015 | |
| CN | 105930495 | | 9/2016 | |
| CN | 108985285 A | * | 12/2018 | ........... G06K 9/2054 |
| CN | 109410095 A | * | 3/2019 | |

OTHER PUBLICATIONS

Machine translation of CN101630327 retrieved from https://patents.google.com/patent/CN101630327A/en? on Dec. 3, 2019.

Machine translation of CN102024049 retrieved from https://patents.google.com/patent/CN102024049A/en? on Dec. 4, 2019.

Machine translation of CN10448334 retrieved from https://patents.google.com/patent/CN104408334A/en? on Dec. 4, 2019.

Machine translation of CN105930495 retrieved from https://patents.google.com/patent/CN105930495A/en? on Dec. 4, 2019.

Wang et al., "Learning Fine-grained Image Similarity with Deep Ranking," CVPR '14 Proceedings of the 2014 IEEE Conference on Computer Vision and Pattern Recognition, Jun. 23-28, 2014, pp. 1386-1393.

Sim et al., "Object Matching Algorithms Using Robust Hausdorff Distance Measures," IEEE Transaction on Image Processing, Mar. 1999, vol. 8, Issue 3, pp. 425-429.

Schroff et al., "FaceNet: A Unified Embedding for Face Recognition and Clustering," 2015 IEEE Conference on Computer Vision and Pattern Recognition (CVPR), Jun. 2015, pp. 815-823.

Sangkloy et al., "The Sketchy Database: Learning to Retrieve Badly Drawn Bunnies," SIGGRAPH '16 Technical Paper, Jul. 24-28, 2016.

* cited by examiner

INFRINGEMENT DETECTION SYSTEM

CROSS-REFERENCE TO RELATED APPLICATIONS

This application is a non-provisional of and claims priority to U.S. Prov. Pat. App. No. 62/777,088, entitled "Potential Infringement Detection," filed Dec. 8, 2018, which is incorporated herein by reference in its entirety.

BACKGROUND

With the rapid global growth of ecommerce, it may be difficult for online marketplaces, sellers, buyers, customs officers, logistics professionals, and/or other entities to identify when a transaction, border crossing, or shipping activity involves an illegal counterfeit good, a knockoff product, and/or an infringing item for sale. Online sales growth may be driven by spontaneous purchases. Ecommerce driven by images (containing one or more trademarks, product designs, or graphical copyrighted content items) can occur when the image is first seen physically by a consumer and then acquired by a mobile device or other computing device for further search (e.g., capturing a picture on a camera or an augmented reality device and then using the image to search online for a product for sale); shared in an online store on a web page and offered for sale; displayed in a frame of video/animation/game with a call to action to purchase online; viewed through an image scan (e.g., x-ray, CT scan or other physical or medical imaging) that can trigger another computerized action or online transaction; or accessed in bulk by online store-generation tools to establish multiple online marketplace/website offerings.

Determining that an image contains a fake or counterfeit (e.g., a product that infringes an intellectual property ("IP") asset such as a trademark, a trade dress, a patent, a copyright, a mask work, or the like) may be difficult. In addition to accidental infringement of IP assets, some products may be knockoffs or pirated products (e.g., deliberate copies of IP assets such as design patents, trade dress registrations, trademarks, mask works, copyrighted works, or the like). Some attempts have been made to match trademark images to other images to detect infringement, but these attempts have not been considered very precise and/or accurate. Namely, these technologies have varying degrees of reliability (often measured as mean average precision or maP) and often do not consistently recognize trademarks in skewed or sharp perspectives. These technologies can be configured to match pixel-based tonal images to other tonal images, which may be considered "richer" than merely black-and-white line drawings and/or bitmapped images. These technologies, however, can fail and/or can produce poor predictive results when the input image is from a non-tonal domain, e.g., a line drawing, a sketch, or an engineering drawing image. Other technologies may attempt to match entire images and may not be properly trained to match one image within a more complex image.

Furthermore, existing technologies can be defeated in a number of ways. In particular, a trademark may be hidden or removed from a potentially infringing product image to prevent matching from occurring. Similarly, images may be rotated, flipped, skewed, inverted or populated with visual noise to make matching difficult. A mark or feature in the image may appear similar to the human eye while not exactly matching an input mark that needs detection. Similarly, some trademark colors may be changed, creating an open question as to whether a match is viable.

Determining that a potentially infringed image is, in fact, offered by an actually infringing, illicit, or otherwise unauthorized third party is a conclusion that is typically not reached by image matching systems. Currently, image matches are escalated to human analysts for a laborious manual evaluation that can include determining a) whether an image match is sufficient to generate concern and b) whether the party displaying, making, using, offering to sell, or selling the product in the image (or the image itself) has the rights to do so.

This determination may often be made only from the viewpoint of the IP creator or owner and it therefore may be rarely if ever possible to make bulk IP infringer party determinations on behalf of an external party.

SUMMARY

The present disclosure is directed to an infringement detection system. The infringement detection system can be directed to multiple domains of interest, including images on the internet, in video, in animations, in live scanner feeds, in video streams, in games, in image scans (e.g., x-rays or CT scans), in images formed from LIDAR, in images captured on cameras, in images captured via augmented reality/mixed reality/virtual reality, or other image types. The concepts and technologies disclosed herein can utilize a database of potential infringing images (e.g., allegedly counterfeit products listed for sale in an online marketplace) and/or a database of proprietary object images (e.g., line drawing figures from design patents). Images in either database may be in original form (e.g., as photographed or drawn), but can also be represented in augmented form (e.g., the images can be rotated, skewed, padded, thresholded, edge detected, and/or otherwise augmented and/or transformed by many other possible image augmentations, effects, and/or transformations). One or more databases may also contain categorization or classification metadata associated with each image. For example, product images may be associated with a marketplace category (e.g., athletic shoes) and patent drawings from a design patent may be associated with a US Design or Locarno classification that can cover, by way of example, golf shoes. It should be understood that this example is illustrative, and therefore should not be construed as being limiting in any way.

Potentially infringing images (e.g., product images) and proprietary object images (e.g., a sketch, a CAD model, a line drawing, a patent drawing, combinations thereof, or the like) may be compared and evaluated for the purpose of generating a coarse match from a trained image comparison engine. The image comparison engine may contain, e.g., a siamese convolutional neural network. The siamese convolutional neural network optionally can include shared embedding using triplet loss. Siamese neural networks may be used to allow independent processing of different domains (e.g., a sketch domain vs. a photo domain), while sharing weights within one or more parts of the network architecture to calculate an embedding loss result that may be interpreted as a predicted image match.

Each side of an example siamese convolutional neural network in the image comparison engine of the infringement detection system may be trained separately to leverage distinctive domain differences during deep learning. The proprietary object image side of the siamese neural network may be trained to predict a US Design or Locarno classification, without ever affecting a prediction on the other side of the neural network, e.g., the marketplace category of a potential infringing (product) image.

The image comparison engine of the infringement detection system may utilize one or more of different loss functions to calculate an embedding loss, e.g., a contrastive or triplet loss, among others. In some embodiments, triplet loss is utilized. In embodiments of the infringement detection system that use triplet loss in a siamese neural network, a shared embedding loss model can be learned by the image comparison engine via training with triplets of the form (S+, I+, I−), where these triplets can indicate a) a single ground truth positive match between an anchor input (sketch) of a proprietary object (S+) and an infringing (genuine or lookalike product) image (I+); and b) many thousands to millions more negative matches of non-infringing images (I−). In this example embodiment, the training triplets can be learned by the siamese neural network to create more embedding distance from the many negative matches than from the few positive matches.

In various embodiments, resulting embedding loss calculations from the image comparison engine can be treated as initial predictions that the product represented in the potential infringing product images is the same or is confusingly similar to the IP represented in the proprietary object images (e.g., patent drawings). Thus, the result of this comparison can be considered (and is referred to herein as) a coarse match of the infringement detection system. A coarse match can include an image pair that has been predicted as infringing by the image comparison engine but has not yet been evaluated by a refined matching step using shape fitting and/or other technologies as will be illustrated and described herein.

Match refinement can provide an increased certainty that an actual infringement has been predicted. At the match refinement stage, additional processing and augmentation may be performed on images to produce refined images optimized for refined matching. Additional processing can include, in some embodiments, gathering metadata for matching items, recording a preliminary match in a database or recorded within a blockchain database, looking up a history associated with one or more matching or related items, and/or other operations. Further augmentation of relevant images can include those augmentations mentioned previously as well as collecting and augmenting additional sketches, drawings, figures, photos or images associated with coarse match items; eliminating irrelevant matter within and around images (e.g., removing dotted lines, hatching, borders, figure names, numbers, etc. representing unclaimed matter in patent drawings); transforming images to appear e.g., rotated in three-dimensional space or rendered as if seen in an X-ray, CT or other advanced imaging scanner output; other operations; combinations thereof; or the like.

Refined image matches, which can contain at least the images from the coarse match but may also contain related images, can be subjected to a shape fitting process. The shape fitting process can evaluate the closest fit of two shapes and can produce a distance value or other value or score (e.g., as a number or vector). Shape fitting may be performed by a Hausdorff distance ("HD"), such as that of the least trimmed squares ("LTS") type, though other modified Hausdorff distance approaches and/or other approaches may be acceptable. In some embodiments, the shape fitting process can be accomplished by a convolutional neural network (the same or another neural network), by additional layers in the siamese neural network that has learned to fit shapes on partial or complete images, and/or by the same neural networks and/or other devices and/or systems.

The emerging refined image matches can be considered as infringing or counterfeit candidates if the shape fitting processing result (e.g., a Hausdorff distance, a resultant vector, or an embedding loss value) exceeds or meets a predetermined target value or visual image example. The target value may be selected so that generating a rendering of the shape-fit refined infringement prediction can a) present a composite image that shows an overlay or side-by-side version of, e.g., a false-color version of one of the refined drawings on top of one of the refined images; and b) can be more probable than not to present a confusingly similar match (between, e.g., an original or refined drawing and an original or refined photo) to an ordinary observer. It should be understood that this example is illustrative, and therefore should not be construed as being limiting in any way.

After shape fitting, it may be beneficial to perform optional confirmation analyses. In some instances, for example, it may be unclear if a matching image is offered or hosted by an authorized party or an unauthorized party. The confirmation analysis therefore can include analyzing metadata; checking authenticity of an associated product, seller or web host via proprietary, open source or product/seller blockchain database data; checking against prior counterfeit, infringement or criminal records; evaluating anomalies in the image or related images; evaluating quick response ("QR") codes or hashed IDs within or associated with images; or evaluating other clues to determine the authenticity of the image, the subject of the image, the host of the image, ownership of the image, parties associated with the image, locations associated with the image, services associated with the image, feedback and sites associated with the image, and/or other counterfeit clues. The confirmation analysis may be performed with a weighted scoring model, regression, neural network or other qualitative and/or quantitative approaches. Scores or predictions that meet or exceed a target value may confirm an unauthorized image or party, further confirming potential infringements in some embodiments.

Potential infringements that are determined to be a) a coarse match, b) a refined match, and c) that satisfy an optional confirmation analysis (if performed) can be documented in a database resident on a server or in memory, where conditional logic can be applied to programmatically execute an optional response action. Other actions can be taken for potential infringements that are determined to satisfy these and/or other criteria.

According to one aspect of the concepts and technologies disclosed herein, a system is disclosed. The system can include a processor and a memory. The memory can store computer-executable instructions that, when executed by the processor, cause the processor to perform operations. The operations can include identifying a domain of interest for an infringement analysis, wherein the domain of interest defines a type of product; obtaining one or more product images associated with a product, wherein the product matches the domain of interest; obtaining at least one patent drawing associated with a patent, wherein the patent matches the domain of interest; identifying a coarse match between a product image and the at least one patent drawing, wherein identifying the coarse match can include identifying, among the one or more product images, a product image that is a best match for the patent drawing; obtaining an augmented patent drawing and an augmented product image associated with the product; shape fitting the augmented patent drawing and the augmented product image to determine if a potential infringement exists, wherein the potential infringement can be determined to exist if the augmented patent drawing and the augmented product image are determined to be a tight fit, wherein the determination that the augmented patent drawing and the augmented product image are a tight fit can be based on a degree of similarity between the augmented patent drawing and the augmented product image; and in response to a determination that the potential infringement exists, performing a confirmational analysis and triggering a response action.

According to another aspect of the concepts and technologies disclosed herein, a device is disclosed. The device can include a processor and a memory. The memory can store computer-executable instructions that, when executed by the processor, cause the processor to perform operations. The operations can include identifying a domain of interest for an infringement analysis, wherein the domain of interest defines a type of product; obtaining at least one product image associated with a product, wherein the product matches the domain of interest; obtaining a patent drawing associated with a patent, wherein the patent matches the domain of interest; identifying a coarse match between the product image and the patent drawing; obtaining an augmented patent drawing and an augmented product image associated with the product; and shape fitting the augmented patent drawing and the augmented product image to determine if a potential infringement exists, wherein the potential infringement can be determined to exist if the augmented patent drawing and the augmented product image are determined to be a tight fit, wherein the determination that the augmented patent drawing and the augmented product image are a tight fit can be based on a degree of similarity between the augmented patent drawing and the augmented product image.

In some embodiments, the computer-executable instructions, when executed by the processor, cause the processor to perform operations further including in response to a determination that the potential infringement exists, performing a confirmational analysis. In some embodiments, the confirmational analysis can include determining if the patent is an enforceable asset; and determining if an offer for sale associated with the product is from a properly authorized seller and includes an offer price that is below a minimum advertised price. In some embodiments, the computer-executable instructions, when executed by the processor, cause the processor to perform operations further including generating a confidence score associated with the potential infringement, the confidence score indicating a degree of confidence that the product represented by the potential infringement infringes the patent.

In some embodiments, obtaining the product image can include obtaining a plurality of product images, and identifying the coarse match can include identifying, among the plurality of product images, a product image that is a best match for a representative patent drawing. In some embodiments, the computer-executable instructions, when executed by the processor, cause the processor to perform operations further including in response to a determination that the potential infringement exists, triggering a response action. In some embodiments, the computer-executable instructions, when executed by the processor, cause the processor to perform operations further including in response to a determination that the potential infringement exists, performing a response action that can include generating, by the processor, an official registration.

In some embodiments, the computer-executable instructions, when executed by the processor, cause the processor to perform operations further including in response to a determination that the potential infringement exists, performing a response action that can include creating, by the processor, a claim chart. In some embodiments, the device further can include a camera, and the product image can be obtained from the camera lens or charge-coupled device sensor receiving light or image data from the camera lens. In some embodiments, the camera can include an X-ray imaging device or radio frequency imaging device. In some embodiments, the product image can be obtained from a website associated with a marketplace, wherein the product can be for sale on the website. In some embodiments, the product image can be obtained from an image database.

In some embodiments, the computer-executable instructions, when executed by the processor, cause the processor to perform operations further including generating output that indicates the degree of similarity; and sending the output to a recipient. In some embodiments, obtaining the augmented patent drawing can include obtaining a further patent drawing associated with the patent; and augmenting the patent drawing with the further patent drawing. In some embodiments, obtaining the augmented product image can include transforming the product image using an edge detection algorithm and a thresholding algorithm to generate a transformed product image.

In some embodiments, obtaining the augmented patent drawing can include obtaining a further patent drawing associated with the patent; and augmenting the further patent drawing. In some embodiments, obtaining the augmented patent drawing can include removing, from the patent drawing, irrelevant or unclaimed matter. In some embodiments, removing the irrelevant matter from the patent drawing can include identifying, using a segmented line detection algorithm, the irrelevant matter, and removing, from the patent drawing, e.g., matter bound dashed, dotted, dash-dotted or hatched lines. In other embodiments, irrelevant matter may be identified by using natural language processing to extract text phrases from patent text sections and compare the phrases to a thesaurus of text terms or patterns known to indicate unclaimed or disclaimed matter.

According to yet another aspect of the concepts and technologies disclosed herein, a computer storage medium is disclosed. The computer storage medium can store computer-executable instructions that, when executed by a processor, cause the processor to perform operations. The operations can include identifying a domain of interest for an infringement analysis, wherein the domain of interest defines a type of product; obtaining one or more product images associated with a product, wherein the product matches the domain of interest; obtaining one or more patent drawings associated with a patent, wherein the patent matches the domain of interest; identifying a coarse match between a product image and the one or more patent drawings, wherein identifying the coarse match can include identifying a product image that is a best match for a patent drawing; obtaining an augmented patent drawing and an augmented product image associated with the product; shape fitting the augmented patent drawing and the augmented product image to determine if a potential infringement exists, wherein the potential infringement can be determined to exist if the augmented patent drawing and the augmented product image are determined to be a tight fit, wherein the determination that the augmented patent drawing and the augmented product image are a tight fit can be based on a degree of similarity between the augmented patent drawing and the augmented product image; and in response to a determination that the potential infringement exists, performing a confirmational analysis and triggering a response action.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

The following detailed description is directed to an infringement detection system and methodologies and technologies that leverage and/or interact with an infringement detection system. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
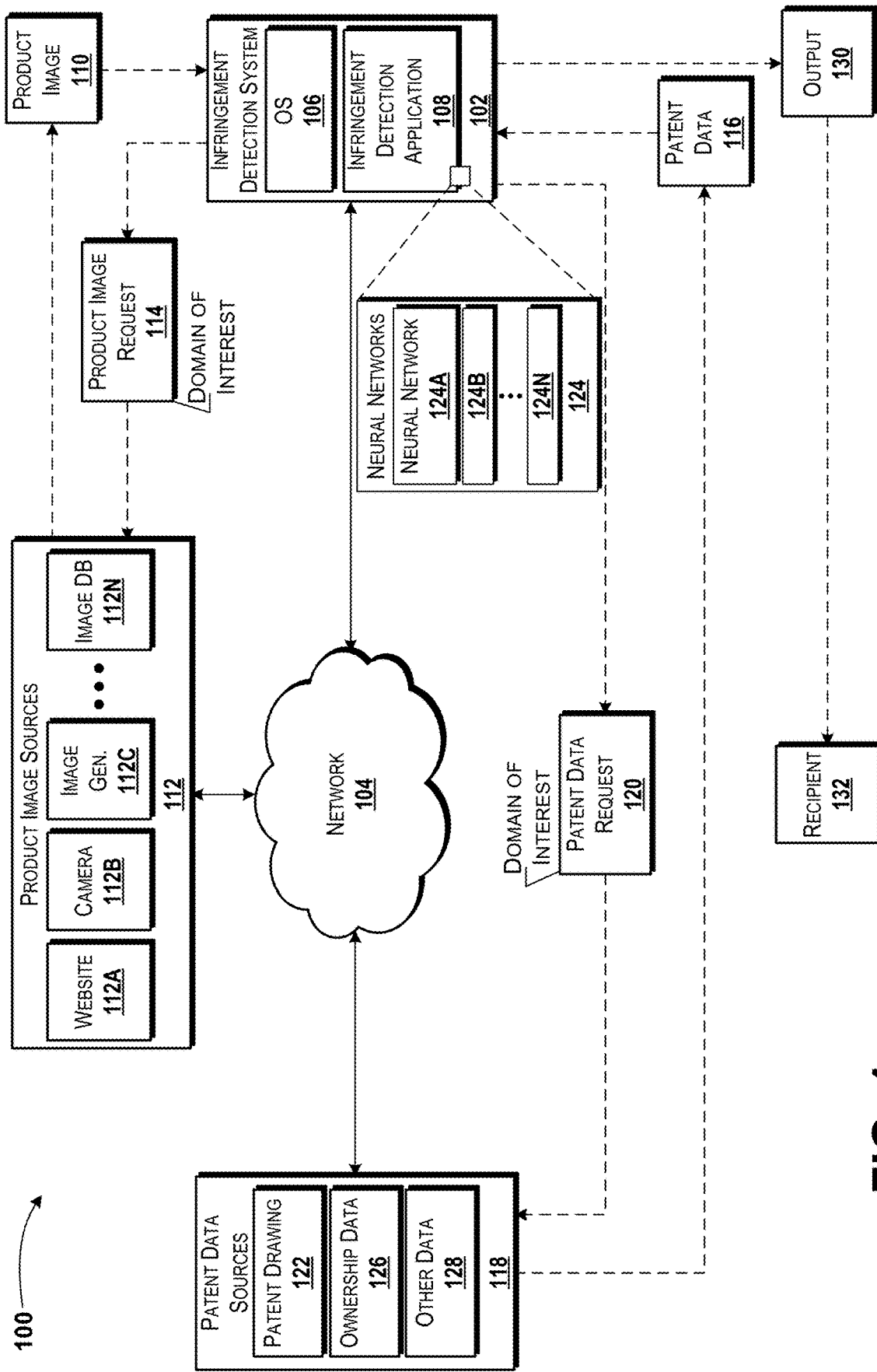
FIG. 1 is a system diagram illustrating an illustrative operating environment for various embodiments of the concepts and technologies described herein.

Referring now to FIG. 1, aspects of an operating environment 100 for various embodiments of the concepts and technologies disclosed herein for providing and/or interacting with an infringement detection system will be described, according to an illustrative embodiment of the concepts and technologies disclosed herein. The operating environment 100 shown in FIG. 1 can include an infringement detection system 102. The infringement detection system 102 can operate in communication with and/or as part of a communications network ("network") 104, though this is not necessarily the case.

According to various embodiments, the functionality of the infringement detection system 102 may be provided by one or more and/or a combination of server computers, desktop computers, laptop computers, tablet computers, embedded computing systems and/or controllers, mobile telephones and/or smartphones, other computing systems or devices, or the like. It should be understood that the functionality of the infringement detection system 102 can be provided by a single device, by two similar or even identical devices, and/or by two or more dissimilar devices. For purposes of describing the concepts and technologies disclosed herein, the infringement detection system 102 is described herein as a computing device such as a server computer. It should be understood that this embodiment is illustrative, and should not be construed as being limiting in any way.

The infringement detection system 102 can execute an operating system 106 and one or more application programs such as, for example, an infringement detection application 108. The operating system 106 can include a computer program for controlling the operation of the infringement detection system 102 and/or components thereof. The infringement detection application 108 can include an executable program that can be configured to execute on top of the operating system 106 to provide various functions as illustrated and described herein. In some embodiments, the infringement detection application 108 can be executed as a web application by the infringement detection system 102, while in other embodiments the infringement detection application 108 can be executed as a native application that can be installed on a computerized device to create the infringement detection system 102. As such, the various functions illustrated and described herein with regard to the infringement detection application 108 will be described with reference to the infringement detection system 102. It should be understood that this is being illustrative of various implementations of the concepts and technologies disclosed herein (e.g., some embodiments where the infringement detection application 108 is installed on a computerized device to form the infringement detection system 102). Thus, it should be understood that the infringement detection system 102 and the functionality ascribed to the infringement detection system 102 can be provided by way of one or more processors executing one or more applications such as, for example, the infringement detection application 108. Because the functionality illustrated and described herein can be provided on or by various devices and/or systems, it should be understood that this implementation is illustrative and therefore should not be construed as being limiting in any way.

According to various embodiments of the concepts and technologies disclosed herein, the infringement detection system 102 can identify infringement or potential infringement of intellectual property assets by performing various operations as provided by the infringement detection application 108. These operations include, in various embodiments, a coarse matching process that can use an image comparison engine or methodology and a refined matching process via shape fitting transformations. In some embodiments, the infringement detection system 102 can also perform a confirmation analysis of suspected counterfeits and/or infringing articles. In some embodiments, the infringement detection system 102 can be configured to trigger and/or perform various response actions in response to a confirmed potential infringement (or confirmed non-infringement). For example, the infringement detection system 102 can be configured to allege infringement, to present alleged infringement evidence to users or other entities, to communicate alleged infringement events to users or other entities, and/or to otherwise output results and/or to otherwise communicate results (e.g., via a computer network such as the network 104). It should be understood that this example is illustrative, and therefore should not be construed as being limiting in any way.

The infringement detection application 108 can be configured to obtain one or more product image 110. The product image 110 can be obtained for any specific domain of interest. As used herein, the phrase "domain of interest" can be used to refer to a particular classification, product, product type, and/or product category. The domain of interest can be used to limit and/or expand the types of product images 110 obtained during any particular analysis. The domain of interest also can be used to limit and/or identify various types of sketches, meshes, point clouds, models, drawings, and/or patent drawings that can be obtained for use in comparing the product images 110 to the sketches, meshes, point clouds, models, drawings, and/or patent drawings. A domain of interest can be broadly and/or narrowly defined. For example, the domain of interest for a specific analysis can include shoes, glasses, electronic devices, tires, automotive parts, toys, jewelry, luxury accessories, etc.

According to various embodiments of the concepts and technologies disclosed herein, the infringement detection system 102 can be configured to identify or obtain an identification of (e.g., via a portal and/or other interactions with a user or other entity, based on a classification of a patent or other sketch that is being used for a comparison, etc.) a domain of interest. For purposes of illustrating and describing some example embodiments of the concepts and technologies disclosed herein, an example domain of interest will be used for various examples. In particular, the example domain of interest used in some examples herein is "shoes," which means the type of product being analyzed in this example is a shoe. It should be understood that this example is illustrative, and therefore should not be construed as being limiting in any way.

The product images 110 can be obtained from one or more product image sources 112A-N(hereinafter collectively and/or generically referred to as "product image sources 112"). The product image sources 112 can include a computerized image generation source (e.g., a generative neural network, a CAD model, a LIDAR image capture, a video gaming world environment, etc.), a camera or scanning device (e.g., a video camera, a video stream, an x-ray scanning device or system, a two-dimensional and/or three-dimensional scanning device or system, a laser scanning device or system, a computer tomography ("CT") x-ray scanning device or system, a computer axial tomography ("CAT") scanning device or system, a light wave scanning device or system, a radiofrequency scanning device or system, other scanners and/or imaging devices, a positron emission technology ("PET") scanning device or system, a magnetic resonance imaging ("MRI") device or system, etc.), and/or an image supply source (e.g., document image collections, collectible image collections, website pages that promote and/or offer products and content for sale, news sites that report on or advertise products for sale, other sites such as marketplaces, social media, search engines, or the like, photo databases, video databases, animation databases, combinations thereof, or the like). In some embodiments, a non-invasive imaging device or system (e.g., an x-ray device, a CT scanner, a CAT scanner, an MRI system, a PET scanner, a radiofrequency scanner, a laser scanner, or the like) is used as the product image source 112. Thus, it can be appreciated that the product images 110 can correspond to actual photographs, drawings or sketches, and/or other imagery of real world items and/or can include computer generated imagery (e.g., meshes, point clouds, CAD models, computer generated solids, etc.).

The product images 110 may be obtained from the product image sources 112 using various approaches. In some embodiments, the product images 110 can be obtained from the product image sources 112 via automated processes such as crawling, scraping, uploading, downloading, mobile device capture, frame-capture, X-ray scans, CT-scans, laser-scans, holography, and/or may be acquired by other methods. In some other embodiments, the product images 110 can be obtained from the product image sources 112 by user input (e.g., selecting an image, directing a camera at an image, scanning an image, downloading an image, uploading an image, etc.). The product image sources 112 can include various sources of imagery such as, for example, one or more website 112A, one or more camera 112B, one or more image generator 112C, one or more image database 112N, and/or other image sources.

The website 112A can include almost any type or kind of web-based site such as, for example, an online marketplace, an online catalog, an online news site, a social media site, other web platforms, combinations thereof, or the like. The website 112A also can include pages or files that may or may not be accessible via the open Internet such as, for example, locally stored files, sites accessible via a small-area or private network (e.g., a corporate intranet), or other files or objects that may be formatted as web pages or web files (e.g., XML files, JSON files, HTML files, or other markup language files) and that may or may not be accessible via one or more network connections. Thus, the website 112A should be understood as being almost any type of file or object including, but not limited to, web pages and/or websites.

The camera 112B can include various image sensing devices and/or image sources such as cameras, scanners, or the like. Thus, the camera 112B can include a digital camera, an image scanner, an X-ray scanner or camera, a medium X-ray system, a backscatter X-ray scanner, a millimeter wave scanner, a radiofrequency scanner, and/or other scanners, cameras, and/or imaging devices. According to various embodiments of the concepts and technologies disclosed herein, the camera 112B illustrated and described herein can include other imaging devices and/or imaging systems that may use one or more devices that work together such as, for example, imaging devices and/or one or more emitters such as, for example, an infrared light emitter and an infrared camera. In one contemplated embodiment, the camera 112B can include an X-ray system (e.g., a luggage scanner at an airport, a shipping container scanning device or other scanning device, etc.). It should be understood that this example is illustrative, and therefore should not be construed as being limiting in any way. Because almost any type of imaging system and/or imaging device can be used to provide the functionality of the camera 112B, it should be understood that the example embodiments listed herein are illustrative and should not be construed as being limiting in any way.

The image generator 112C (labelled "Image Gen." in FIG. 1) can include various image generators such as, for example, gaming environments, rendering software, CAD software, sketch-to-image services, neural networks, and/or applications (e.g., various applications that may use one or more neural networks such as, for example, a deep convolutional generative adversarial network ("DCGAN"), a conditional generative adversarial network ("cGAN"), a cross-domain convolutional network, combinations thereof, or the like), and/or other image generation technologies to create an image, sketch, or the like. In some embodiments, the image generator 112C can output a line drawing or sketch as the product image 110. In some other embodiments, the image generator 112C can output a simulated image as the product image 110. Some examples of imagery that can be created by functionality such as that illustrated and described herein with reference to the image generator 112C will be discussed below with reference to FIG. 9. The concepts and technologies disclosed herein can be configured to compare images, simulated images, sketches, and/or other forms of imagery. Thus, these and other examples of product images 110 should not be construed as being limiting in any way.

The image database 112N (labelled "Image DB" in FIG. 1) can include various image databases such as, for example, image directories associated with websites and/or marketplaces, web-based image search services and/or systems (e.g., the GOOGLE IMAGE SEARCH service from Google, Inc.), image repositories, and/or other image data that may be accessible to any of the elements of the operating environment 100 illustrated and described in FIG. 1. According to various implementations of the concepts and technologies disclosed herein, the image database 112N also can include a SQL or non-SQL database.

The image database 112N can store images and/or other imagery (e.g., sketches, renderings, photographs, vectors of images, etc.), as well as data that can be mapped to relationships about known and suspect counterfeits, represented at least by images. In one contemplated embodiment, each image entry in the database can be associated with textual, numerical, and/or other qualitative and/or quantitative metadata such as, for example, identifiers, categorizations, classifications, prices, quantities, parties, provenance, historical backgrounds for the product, security indications, blockchain activity, product histories, seller histories, shipping histories, sales histories, feedback histories, in-process investigations indicators, rights statuses, and/or other facts or data that can be used, for example, to describe, provide context for, and/or to provide background for, a particular product image 110 that is obtained from the image database 112N and/or other product image sources 112. Of course, these and other types of information can be obtained from other product image sources 112 and/or other sources as illustrated and described herein without departing from the scope of the claims.

According to various embodiments, the image database 112N can store and/or can access natural language processed ("NLP") data associated with images; e.g., top co-occurring phrases, extracted sentiments, extracted entities, relevant clusters, modeled topics, or the like. These and other NLP data can be obtained from, for example, page or article titles, abstracts, classifications, category names metadata, entity names, related feedback, descriptions, and/or other types of information. The image database 112N also can store and/or can access category concordance information about the product images 110, or about products or content represented by the product images 110. Such category concordance information can represent, for example, a relationship between product images 110 of potential counterfeits and other taxonomies, e.g., Locarno classification identifiers such as, for example, identifying a shoe as a golf shoe, boot, pump, sandal, heel, or the like. Thus, the category concordance information can be used to enhance matching as will be explained in more detail herein.

The product image sources 112 can store product images 110 in their as-acquired formats and/or in modified versions. For example, the product images sources 112 can store product images 110 as augmented images including, but not limited to, augmented or transformed versions of the product images 110. As used herein, augmented images or transformed images (e.g., augmented or transformed versions of the product images 110) can correspond to images created by way of modifying the product images 110 from an as-acquired format to a different format such as, for example, a format that can be more readily and/or more efficiently compared to a proprietary object image (e.g., a sketch, a patent drawing, a trademark drawing, a trade dress drawing, etc.) as will be explained in more detail below. These augmentations and/or transformations can provide variations that can be learned or that can be evaluated by the infringement detection system 102 by machine learning and/or programming. It should be understood that this example is illustrative, and therefore should not be construed as being limiting in any way.

According to various embodiments of the concepts and technologies disclosed herein, the infringement detection system 102 can augment and/or transform the product images 110 by way of applying various operations. For example, the product images 110 can be modified by the infringement detection system 102 (and/or other entities) by applying, to the product images 110, various image modification operations such as rotation, skewing, padding, jittering, thresholding, edge detection, resizing, flipping, watermarking, mean-subtraction, inversion, posterization, simulating X-ray, colorization, color isolation, and/or other image modification operations. In some embodiments, the infringement detection system 102 and/or other entities can apply multiple operations to a product image 110 to obtain the augmented and/or transformed version thereof. Thus, in some embodiments the infringement detection system 102 can store and/or access operation workflows (e.g., a set of operations to be performed in a defined order or in no particular order) to augment and/or transform the product images 110. As such, it can be appreciated with reference to FIG. 1 that product images 110 can be obtained from almost any type of image data source and that the product images 110 can be subjected to various types of modifications and/or sets of modifications in accordance with the concepts and technologies disclosed herein. Thus, the illustrated examples of the product image sources 112 are merely illustrative of some example embodiments and should not be construed as being limiting in any way.

In some embodiments, the infringement detection system 102 can be configured to identify the domain of interest (e.g., automatically and/or based on user input) and can send a product image request 114 to the product image sources 112. According to various embodiments, the product image request 114 can include an explicit request (e.g., the product image request 114 can be generated as an explicit request), while in some other embodiments, the product image request 114 can correspond to a service call, a query (e.g., a query string, a web query, a SQL query, etc.), or other request. In various embodiments of the concepts and technologies disclosed herein, the product image request 114 can specify the determined domain of interest as a parameter or search term. It can be appreciated that the product image request 114 can specify the domain of interest and/or other search parameters according to various embodiments of the concepts and technologies disclosed herein. Thus, in the example embodiment of shoes, the product image request 114 can indicate that "shoes" are the domain of interest and the product image request 114 therefore can effectively request "shoe images" from the product image sources 112. It should be understood that this example is illustrative, and therefore should not be construed as being limiting in any way.

The infringement detection system 102 can be configured to obtain one or more types of reference information to which to compare the product images 110. According to some embodiments, the reference information can include photographs, video frames, sketches, line drawings, trade dress drawings, drawings from patents, combinations thereof, or the like, as well as various types of information that can provide details relating to these and/or other types of information such as ownership information, enforceability information, source information, combinations thereof, or the like. In some embodiments, as shown in FIG. 1, the reference information can include patent data 116 (e.g., drawings from a patent and/or various types of information relating to patents such as ownership information, validity information, etc.), which can be obtained from one or more patent data sources 118. It should be understood that this example is illustrative of the concepts and technologies disclosed herein for comparing a product image 110 to a reference image, and therefore should not be construed as being limiting in any way.

As explained above with regard to the product image 110, the patent data 116 can be obtained for a specific domain of interest that can be used to limit the types of patent data 116 obtained. Also, as will be explained in more detail below, the patent data sources 118 can store as-acquired versions of patent data 116 and/or augmented and/or transformed versions of the patent data 116. According to various embodiments, the infringement detection system 102 can generate a patent data request 120. The patent data request 120 can include data that specifies the domain of interest, and the patent data request 120 can be communicated by the infringement detection system 102 to one or more of the patent data sources 118. In some other embodiments, a user or other entity can enter a patent number or other identifier, and various types of information associated with that patent can define the domain of interest (e.g., a classification system associated with the patent can define the domain of interest, in some embodiments). It should be understood that this example is illustrative, and therefore should not be construed as being limiting in any way.

According to various embodiments of the concepts and technologies disclosed herein, the patent data 116 can include at least one sketch, line drawing, patent drawing, or other form of imagery that can be used as a reference image to which the product image 110 will be compared. In the example shown in FIG. 1 (wherein patents are used as the reference information and the drawings from the patent are used as the reference image), the reference image can correspond to a patent drawing 122. It should be understood that although patent drawings 122 and other patent data 116 are discussed with regard to the example embodiments illustrated and described herein, the concepts and technologies disclosed herein can be implemented with other types of drawings and/or sketches as mentioned above. As such, the embodiments illustrated and described herein for comparing product images 110 to patent drawings 122 should be understood as being illustrative of the concepts and technologies disclosed herein and should not be construed as being limiting in any way.

The patent data 116 also can include ownership data 126 and other data 128, each of which will be explained in more detail below. The patent drawing 122 can include one or more patent drawings and/or modified forms of patent drawings. The patent drawings 122 can be obtained from one or more patent databases and therefore can correspond, in some embodiments, to one or more drawings for a design patent or industrial design. Thus, it should be understood that the patent data sources 118 can include one or more patent databases, in some embodiments. Because the patent drawing 122 can be used for additional and/or alternative reasons, and because the patent drawing 122 can be obtained from additional and/or alternative sources, it should be understood that the above examples are illustrative, and therefore should not be construed as being limiting in any way.

As noted above with regard to the product images 110, the patent drawings 122 obtained by the infringement detection system 102 also can be obtained in as-acquired formats (e.g., images from patents) and/or can be obtained in modified formats (e.g., augmented and/or transformed). In some other embodiments, the infringement detection system 102 can obtain the patent drawings 122 in an as-acquired format and can modify the drawings using operations and/or workflows. As noted above with regard to the product images 110, the patent drawings 122 can be modified by the infringement detection system 102 by applying various image modification operations such as, for example, rotation, skewing, padding, jittering, thresholding, edge detection, resizing, flipping, watermarking, mean-subtraction, inversion, posterization, simulating X-ray, and/or other operations. In one contemplated embodiment, the infringement detection system 102 can use OCR text recognition or another neural network to recognize text in an image, indicating that the image is actually comprised of multiple sub-images (e.g., multiple labeled patent drawing figures on the same page of a design patent document). The augmentation workflow may further create bounding box proposals and save each bounded image region into a new, named image file with associated metadata relating to its parent image and source origin. It should be understood that this example is illustrative, and therefore should not be construed as being limiting in any way.

The patent data 116 also can include ownership data 126, as noted above. The ownership data 126 can reflect ownership information associated with any patent. Thus, the ownership data 126 can include assignment data, legal status data, family data, litigation data, inventor data, and/or any other type of information that can capture or indicate encumbrances and/or ownership (e.g., security interests, collateral agreements, etc.) of a patent. This information can be used by the infringement detection system 102 to determine if a potentially infringing site or image is co-owned, in some embodiments. Thus, it should be understood that the patent data sources 118 can include one or more patent databases, one or more assignment databases, and/or other sources of ownership information (e.g., news sites, court filings, etc.). Because the ownership data 126 can be used for additional and/or alternative reasons, and because the ownership data 126 can be obtained from additional and/or alternative sources, it should be understood that the above examples are illustrative, and therefore should not be construed as being limiting in any way.

The other data 128 can include a host of other information that can be obtained from various patent data sources 118. The other data 128 can include, for example, court proceeding history information, post-grant procedure information, and/or other proceedings that may impact the enforceability and/or validity of a particular patent. The other data 128 also can indicate, for example, other suits or proceedings involving a particular party (e.g., a potential infringer), in some embodiments. The other data 128 also can include, for example, geographic location information associated with owners, inventors, proceedings, manufacturing, combinations thereof, or the like. The other data 128 also can include other information as will be illustrated and described herein. Because the other data 128 can be used for additional and/or alternative reasons, and because the other data 128 can be obtained from additional and/or alternative sources, it should be understood that the above examples are illustrative, and therefore should not be construed as being limiting in any way.

Thus, the patent data sources 118 can include any reference set of patent drawings 122 and/or other images owned by a rights controlling party. In some embodiments, the patent data sources 118 can include a patent, trademark, copyright or other design corpus from a rights granting authority. The patent drawings 122 may relate to other images, e.g., the drawings contained on various pages in the same patent or patent family; or shown together on a single page of a patent; or contained within the same trademark image; or contained within the same copyrighted video frame; or contained in an augmented version of an image that is identical to or associated with a proprietary object image that functions as the patent drawing 122. Thus, the patent data source 118 can also store and/or can access category information, unique identifiers, bibliometric data, legal status data, full text data, translated data, and NLP-extracted data about the image, among other types of information.

According to various embodiments of the concepts and technologies disclosed herein, the infringement detection system 102 can initiate a comparison in a specified domain of interest. The domain of interest may be broad or narrow, e.g., all products sold on a particular website or a product category area where a stakeholder (e.g., a patent owner) maintains enforceable IP rights in a territory. Thus, in some embodiments, the stakeholder can include, for example, a shoe manufacturer, an eyewear designer, a consumer electronics company, or the like. It should be understood that these examples are illustrative, and therefore should not be construed as being limiting in any way.

In practice, the infringement detection system 102 can obtain the product image 110 and the patent data 116 as noted above and can begin the analysis to determine if product image 110 potentially infringes the patent associated with the obtained patent data 116. In particular, the product images 110 can be obtained from the product image sources 112 based on some relationship to the domain of interest. For example, the product images 110 can include or can be associated with athletic shoes, sport sunglasses, over the ear headphones, or the like. The product image 110 may be selected for their content, provenance, category, or other attribute. In some embodiments, the product images 110 are obtained based on associated catalog categories or tags in a taxonomy or ontology, which can correspond to categories associated with particular patent drawings 122 that have been identified as being the basis on which an infringement analysis is being performed. Thus, in some embodiments the patent drawings 122 can be input by a user or other entity, the domain of interest can be defined by the user or other entity or by the classification or other information associated with the patent drawings 122 (e.g., a classification associated with the underlying patent), and the product images 110 can be searched for by the infringement detection system 102 to perform the analysis illustrated and described herein.

In various embodiments, the product images 110 and the patent drawings 122 can be analyzed by the infringement detection system 102 using a two-part analysis, for example. In some example embodiments, the first part of the two-part analysis can include the infringement detection system 102 performing a coarse match analysis of the images (e.g., a patent drawing 122 and a product image 110). In some embodiments, the infringement detection system 102 can include and/or can use or access an image comparison engine, as will be explained in more detail below.

In various embodiments of the concepts and technologies disclosed herein, the infringement detection application 108 can include any number of neural networks 124A-N (hereinafter collectively and/or generically referred to as "neural networks 124"). Thus, the functionality of the "image comparison engine" discussed herein can be performed by the infringement detection system 102 and therefore functionality of the image analysis engine may be referred to herein as applying to the infringement detection system 102 and/or the infringement detection application 108. In some embodiments, the infringement detection system 102 and/or the infringement detection application 108 can include (or can access and/or can be) a siamese convolutional neural network, which can enable a cross-domain comparison via deep learning. In this example embodiment, a first domain of the cross-domain siamese convolutional neural network can include line drawings, figures, or sketches (e.g., the patent drawings 122), and the second domain of the cross-domain siamese convolutional neural network can include tonal photos, video frames, scanned images, rendered three-dimensional illustrations, X-ray images, or other images (e.g., the product images 110). According to various embodiments of the concepts and technologies disclosed herein, various types of image domains can be coarse matched by training the infringement detection system 102. It should be understood that this example is illustrative, and therefore should not be construed as being limiting in any way.

In some embodiments, the image comparison engine (and/or the infringement detection system 102 that includes the image comparison engine as shown in FIG. 1) can be trained for cross-domain comparison of line drawings from patent figures (e.g., the patent drawings 122) to product images 110 (e.g., images from online sellers). The training can include using two or more versions (subnetworks) of the same neural network design (e.g., fine-tuned AlexNet, GoogleNet, VGG or other architectures), which can be fine-tuned in a deep learning training environment such as Caffe (as maintained by UC Berkeley). It should be understood that this example is illustrative, and therefore should not be construed as being limiting in any way.

In some embodiments, the infringement detection system 102 and/or a first subnetwork of the neural network 124 that can provide the functionality of the infringement detection system 102 as illustrated and described herein, can learn weights for suspect infringing product images 110 in their original ("as-acquired") form and/or in their augmented forms, and can determine an independent (e.g., not shared) classification loss (such as a softmax loss) based on tags or category attributes associated with the product images 110. Thus, for example, the infringement detection system 102 can prevent identifying infringement in unrelated goods (e.g., preventing a football from being suspected as being infringed by a blimp due to having similar shapes).

In some embodiments, the infringement detection system 102 and/or a second subnetwork of the neural network 124 that can provide the functionality of the infringement detection system 102 as illustrated and described herein, can be configured to learn weights for proprietary object images such as patent drawings 122. Thus, the infringement detection system 102 can learn images of items considered to be authentic (images may be in multiple original and/or augmented views), and can determine an independent classification loss based on categories associated with the images (e.g., US, IPC, CPC, Locarno, Madrid, Hague, F-Terms or other rights classification systems).

In some embodiments, the infringement detection system 102 and/or a third subnetwork of the neural network 124 that can provide the functionality of the infringement detection system 102 as illustrated and described herein, may be identically weighted to the first and/or second subnetworks and may be used for triplet loss training, among other tasks. It should be understood, however, that other triplet neural network architectures are within the scope of the disclosure. Training a siamese neural network to perform cross-domain matching can include learning a shared embedding such that distances in the learned feature space can be related to structural and semantic similarity between the domains. The embedding distance may be calculated based on a learned loss function, which can include, for example, angular, histogram, contrastive, regression, softmax, Euclidean distance, triplet or "ranking" loss, or others. In various embodiments of the concepts and technologies disclosed herein, any loss functions can be used to train the neural network 124 or its subnetworks if the mean average precision (maP) is improved after training. It should be understood that this example is illustrative, and therefore should not be construed as being limiting in any way.

In one embodiment, the infringement detection system 102 is trained with triplet loss as the embedding loss. For triplet loss as used to train the infringement detection system 102, supervision can be of the form "input a should be closer to input b than to input c." Triplet training can utilize three subnetworks with input tuples of the form (S; I+; I−) corresponding to a sketch, a matching image (the ground truth), and a non-matching image. For triplet loss training, two subnetworks (any subnetwork that is not the first instance of the second subnetwork) can share weights. As a result, the siamese neural network versions of the infringement detection system 102 (e.g., neural networks 124 with two subnetworks that can create a match) and triplet network versions (with three subnetworks that can be trained with triplets for a learned embedding loss) can have one set of weights for the first subnetwork, anchor domain (e.g., S+ line drawings representing actual images of the product) and one set of weights for the second domain (e.g., the second subnetwork; e.g., I+ positive photo images representing product images 110), and a third domain (e.g., the third subnetwork; e.g., I− negative photo images representing non-infringing images). The infringement detection system 102 can be trained to minimize a distance (e.g., a Euclidean distance or Cosine distance) from the anchor to the positive, and to maximize a distance (e.g., a Euclidean distance or Cosine distance) from the anchor to the negative. It should be understood that this example is illustrative, and therefore should not be construed as being limiting in any way.

The triplet loss as illustrated and described herein is an approach that minimizes the distance (e.g., the Euclidean distance, the Cosine distance, and/or other distance) between an anchor and a positive (e.g., the S and I+ as discussed herein), both of which have the same identity, and maximizes the distance (e.g., the Euclidean distance, the Cosine distance, and/or other distance) between the anchor and a negative (e.g., the S and I− as discussed herein), wherein the I− (negative) has a different identity. Some embodiments of using triplet loss are disclosed by Schroff et al., "FaceNet: A Unified Embedding for Face Recognition and Clustering," Proceedings of the IEEE Computer Society Conference on Computer Vision and Pattern Recognition 2015, 2015, pages 815-823, which is incorporated herein by reference in its entirety. Some additional aspects of triplet loss are disclosed by Wang et al., "Learning Fine-grained Image Similarity with Deep Ranking," "Learning Fine-grained Image Similarity with Deep Ranking," CVPR '14 Proceedings of the 2014 IEEE Conference on Computer Vision and Pattern Recognition, Jun. 23-28, 2014, pages 1386-1393, which is incorporated herein by reference in its entirety. It should be understood that this example is illustrative, and therefore should not be construed as being limiting in any way.

In one example embodiment of training of the neural networks 124, inputs for training can include a pair of images, where each pair can include a patent drawing 122 and a product image 110. In some embodiments, these pairs can be generated based on known instances of infringement, though this is not necessarily the case. The respective components of the pair can be passed to the appropriate subnetwork (the patent drawing 122 to a first subnetwork and the product image 110 to a second subnetwork), and an indication whether or not the pair is matching can be known to the infringement detection system 102 that includes the neural network(s) 124.

In various implementations of the triplet loss network, the two branches will share weights, with one set of weights for the patent drawing 122 and one set of weights for the product image 110. As disclosed in Sangkloy et al., "The Sketchy Database: Learning to Retrieve Badly Drawn Bunnies," SIGGRAPH '16 Technical Paper, Jul. 24-28, 2016, which is incorporated herein by reference in its entirety, a sketch-based image retrieval system that incorporates classification loss and triplet loss together resulted in a K=1 recall (i.e., an optimal match found for the reference sketch was found in the first retrieval result of one thousand two hundred fifty test photos) in about thirty seven percent of searches, meaning that a correct match could be determined in the top eight retrieval results approximately ninety percent of the time. It should be understood that this example is illustrative, and therefore should not be construed as being limiting in any way.

According to various embodiments of the concepts and technologies disclosed herein, triplets fed into the subnetworks for training of the infringement detection system 102 may be organized any number of ways. In some embodiments, sampling of I+ images and I− images for training triplets can involve sampling from within a single domain, category, and/or classification, and then delivering training triplets to the subnetworks in an order that can be advantageous to speed training, (e.g., hard negative mining). When triplet training is complete, one or more adjudicated case training triplets can have been fed into the three subnetworks, which can cause a learning event over one or more epochs that can adjust network parameters such as the learned embedding distance based on the triplet inputs. It should be understood that this example is illustrative, and therefore should not be construed as being limiting in any way.

In one contemplated embodiment, the infringement detection system 102 can be trained with a triplet loss function to be run in a siamese implementation, e.g., with two subnetworks that can map cross-domain features into a shared dimensional feature space. In one operating example, a suspect infringing photo in a database can be programmatically input into a first subnetwork and an authentic patent figure drawing can be input into the second subnetwork. The infringement detection system 102 can compute a loss function distance that, when compared to a reference (e.g., a learned, arbitrary, hyperparameter, or benchmark value), can indicate a coarse match. One or more coarse image matches returned by the infringement detection system 102 from running (or accessing) an image comparison engine may be deemed to be an initial prediction of infringement, subject to further refined matching.

For clarification, input images from the database (and their augmented forms) may be compared in their entireties, or elements of the images may be identified, isolated or extracted first, e.g., using another neural network 124 to make region proposals (e.g., implementing Faster R-CNN or SSD: Single Shot MultiBox Detector). Integration of a region proposal neural network may occur as an external preprocessing step; as part of integrating another subnetwork within the image comparison engine; and/or as part of integrating relevant convolutional and fully connected layers within the architectures of the first through third subnetworks. It should be understood that these examples are illustrative, and therefore should not be construed as being limiting in any way.

Thus, outputs from the infringement detection system 102 (e.g., by running or accessing the image comparison engine) may consist of comparisons between images in the first subnetwork to the first subnetwork; the first subnetwork to the second subnetwork; the second subnetwork to the first subnetwork; the second subnetwork to the second subnetwork; or the like, and these comparisons can be further processed during a match refining stage as will be illustrated and described herein. It should be understood that this example is illustrative, and therefore should not be construed as being limiting in any way.

According to various embodiments of the concepts and technologies disclosed herein, the infringement detection system 102 can transform the images for comparison. In various embodiments of the concepts and technologies disclosed herein, the image transformation can be performed before the match refinement stage is performed, though this is not necessarily the case. According to various embodiments, the transformation of the images can include transforming the patent drawing 122 of the patent data 116 into a model or vector for mapping and/or comparison purposes. Additionally, the product image 110 can be transformed to identify areas of interest and/or to modify the image to approximate a sketch or drawing (similar to patent drawings 122) to improve comparison. It should be understood that this example is illustrative, and therefore should not be construed as being limiting in any way.

According to various embodiments of the concepts and technologies disclosed herein, the patent drawings 122 and the product images 110 can be augmented and/or transformed for match refinement. With regard to the patent drawings 122, augmentation can include adding relevant drawings, while for the product images 110, augmentation can include adding photos for refined matching. For example, when a patent drawing 122 (e.g., a line drawing from a patent that also can be represented as a Locarno-classified numbered figure with live legal status in the database) is predicted to be an optimal match (to be a coarse match) for a product image 110 (e.g., an example photo of a product also associated with a catalog-categorized currently-online sales offer in the database), one or more collections of drawings and/or photos can be gathered for further comparison. In particular, a first collection can contain other numbered figures from the coarse-matched patent drawing 122, potentially providing other views or details of the potentially infringed underlying design associated with the patent from which the patent drawing 122 was taken. A second collection can include database entries of similar or relevant sales offers associated with the coarse-matched product image 110 (as may be determined by Locarno class, catalog category, key word, modeled topic, seller identifier, product identifier, marketplace identifier, price range, image similarity, blockchain activity or other related data). It should be understood that this example is illustrative, and therefore should not be construed as being limiting in any way.

In various embodiments of the concepts and technologies disclosed herein, the additional patent drawings 122 (e.g., from the first collection) can be further augmented to eliminate irrelevant matter before a refined match may be attempted. For example, dashed lines, hatched lines, dotted lines, dash-dotted lines, or other forms of broken lines (e.g., center lines, phantom lines, hidden lines, etc.) in US design patents can be used to denote unclaimed matter (e.g., in some instances subject matter that is not claimed may be bound by broken lines). The unclaimed matter, however, may aid in context and therefore may be considered during part of the analysis (and/or to define the domain of interest) and may be ignored in other parts of the analysis. Put another way, retaining subject matter denoted by dashed lines or other forms of broken lines in a design patent drawing can assist during the coarse match phase (e.g., to help recognized and/or match overall shapes), but may this subject matter may be removed for refined matching in some embodiments as that matter may be irrelevant to patent infringement. It should be understood that this example is illustrative, and therefore should not be construed as being limiting in any way. In some embodiments of the concepts and technologies disclosed herein, the patent drawings 122 may be processed by a broken line detection algorithm or another neural network 124, as will be explained in more detail below with reference to FIG. 2A.

The product images 110 in the second collection also can be augmented and/or transformed, for example, to modify the product images 110 such that they may resemble line drawings. In some embodiments, such modifications (to modify the product images 110 so that they approximate line drawings) can heighten the sensitivity of a match between the patent drawings 122 and the product images 110. Various thresholding methods can be performed on the product images 110 to approximate line drawings such as, for example, edge detection and the like. These and other thresholding techniques are illustrated and described in more detail below with reference to FIG. 2A.

The infringement detection system 102 can compare the transformed product images 110 to the patent drawings 122 to determine if the product image 110 and the patent drawings 122 are similar and/or overlap. To do so, the infringement detection system 102 can apply a shape fitting process to determine if the augmented product images 110 and the augmented patent drawings 122 are a "tight fit." A tight fit can be determined to exist when an LTS-HD (a least trimmed squares Hausdorff distance) result is close to, or less than, a desired minimum value that can be defined and/or learned by the infringement detection system 102. The defined LTS-HD result, in some embodiments, can require a hyperparameter h that can be defined, or learned to be, a value of 0.60 to 0.80. It should be understood that this example is illustrative, and therefore should not be construed as being limiting in any way.

More particularly, according to various embodiments of the concepts and technologies disclosed herein, the hyperparameter h associated with the LTS-HD result can be a directed distance that can be defined by a linear combination of order statistics (e.g., h (A, B), where the measure h (A, B) can be minimized by other distance values after large distance values are eliminated (and therefore can be insensitive to outliers and/or occlusions). Thus, it can be appreciated that this approach can be helpful in cases where the product image 110 includes noise or other degradations and/or where the subject of the product image 110 is partially occluded. Sorting and summation operations may be required in obtaining the LTS-HD measure. The hyperparameter h, which can range from zero to one, can vary based on an amount of occlusion, and a value of one can correspond to a modified HD measure.

As noted above, in various embodiments of the concepts and technologies disclosed herein, an LTS-HD result with an h=0.60 to 0.80 can indicate an optimal match, though the exact parameters of the LTS-HD may not be accurately determined definitively (but can be determined experimentally, i.e., through learning) in some embodiments. In one contemplated embodiment of the concepts and technologies disclosed herein, the LTS-HD result for an optimal match can have an h of 0.70. Of course, many details of the LTS-HD result are known and are not repeated herein for the sake of brevity, as disclosed by Sim et al., "Object Matching Algorithms Using Robust Hausdorff Distance Measures," IEEE Transactions on Image Processing, Vol. 8, No. 3, 1999, pages 425-429, which is incorporated herein by reference in its entirety. Because variations of the LTS-HD result and/or the h hyperparameter are possible and are contemplated, it should be understood that the above example embodiment is illustrative and therefore should not be construed as being limiting in any way.

The shape fitting process is illustrated and described in more detail below with reference to FIG. 2A, but briefly can include attempting to fit the images to one another and outputting a value, vector, embedding distance, and/or other data that can indicate whether the augmented product image 110 is a tight fit (e.g., closely matches the augmented patent drawing 122 in such a way as to be confusingly similar to an ordinary observer). It should be understood that this example is illustrative, and therefore should not be construed as being limiting in any way.

The infringement detection system 102 can output information indicating the potential infringement of a patent by a product (e.g., by detecting a tight fit between the augmented patent drawing 122 and the augmented product image 110). In various embodiments of the concepts and technologies disclosed herein, the infringement detection system 102 can detect (to a high degree of certainty and accuracy) that there is an infringement (and not merely a copy) of a particular intellectual property asset (e.g., a patent, a trademark, a trade dress, a copyright, a mask work, or the like), and therefore can avoid using image detection as an exclusive infringement indicator. If a potential infringement is determined, the infringement detection system 102 can be configured to trigger an optional confirmational analysis of the potential infringement and/or can trigger optional response actions, as will be explained in more detail below.

According to various embodiments, the infringement detection system 102 can perform a confirmational analysis of the underlying patent (the patent from which the one or more patent drawings 122 are taken). A confirmational analysis as illustrated and described herein may include checks of counterfeit clues associated with refined infringement predictions, such as a legal metadata analysis in which the infringement detection system 102 can determine if the matched patent is enforceable with proper legal status in a relevant geographic territory (e.g., by accessing ownership data 126 and other data 128 that can indicate, for example, maintenance fee payment status, legal proceedings information, inter partes review ("IPR") information, etc.); an authentic product check (e.g., is a product associated with the product image 110 listed on any suspected infringer lists or sites or otherwise associated with a known infringer such as, for example, a notorious/blacklist/whitelist/suspect location/market/site/IP address/blockchain); a price and/or terms check in which the infringement detection system 102 can determine if a product that is suspected as an infringing product is priced less than a known minimum advertised price or does a vendor's estimated stock, estimated sales, minimums, quantities on hand, or other information fail to comport with expected figures such as these; a behavior check in which the infringement detection system 102 can determine if the seller is active in unauthorized categories of sales and/or has been associated with negative feedback; a text and image anomaly check in which the infringement detection system 102 can determine if an associated image or text item includes misspelled words, inappropriate trademarks, or unacceptable ad claims; and a known counterfeit associations check in which the infringement detection system 102 can determine if the seller information matches prior identified suspicious criteria, if the seller is part of a suspect network under investigation, and/or if seller IDs, analytics codes and other identifiers have been associated with public or blockchain-listed suspicious activity. These and other checks can be performed by the infringement detection system 102 and the results can be analyzed to support or challenge the infringement finding.

According to various embodiments of the concepts and technologies disclosed herein, the infringement detection system 102 can perform the confirmation analysis as well. In particular, the infringement detection system 102 can perform the confirmation analysis using a statistical model and a data model that can produce a weighted confidence score. The weighted confidence score can be configured to ascribe a weight to these and other factors, where a weighted confidence score can support (high confidence) or challenge (low confidence) a finding of infringement. In some embodiments, the weighted confidence score can include an average or other weighted combination of a first score that can indicate if the source address hosts infringing items, a second that can indicate the risk that terms of the offer are not typical/sanctioned, a third score that can indicate if the seller is exhibiting brand-harming characteristics; a fourth score that can indicate if the seller or item for sale is part of a known counterfeit network; etc. The confirmation analysis may also be achieved by yet another neural network 124. A neural network 124 trained on e.g., bona fide and counterfeit sales listings may be used to learn counterfeit clues and to output a vector, value and/or embedding loss that predicts the risk that the listing is unauthorized to host the refined infringement prediction, enabling confirmation of infringement. It should be understood that this example is illustrative, and therefore should not be construed as being limiting in any way.

If the infringement detection system 102 confirms a potential infringement identified during the match refinement phase (e.g., if the confirmation analysis confirms the infringement or if no confirmational analysis is performed), the infringement detection system 102 can be configured to take or to trigger one or more response actions. According to various embodiments, the infringement detection system 102 can be configured to generate an API call, to modify or enter data into a database, to draft and/or send a message or alert, to draft and/or send a report, to create and/or log a certificate, to associate information in a database, to perform a transaction, to generate a direct notification, to generate an official registration, to create an accurate legal complaint, to create and/or validate a distributed ledger entry, to create an artificial intelligence ("AI") chatbot communication, to create an augmented rendering, to generate a two-and-a-half dimensional or three dimensional model image, or to take additional and/or alternative actions. These types of actions are briefly explained in the following paragraphs. Because other actions can be taken in various embodiments of the concepts and technologies disclosed herein, these examples of response actions should be understood as being illustrative and therefore should not be construed as being limiting in any way.

In some embodiments, as noted above, if the infringement detection system 102 confirms a potential infringement, the infringement detection system 102 can be configured to trigger an API call to one or more devices. In particular, the infringement detection system 102 can be configured to trigger the sending or retrieving of data based on the prediction. For example, the infringement detection system 102 can be configured to trigger an API call to send data to a particular device (e.g., an infringement clearinghouse), to retrieve data from a particular device (e.g., sales information and/or traffic information), to initiate a new action (e.g., to access a book or report or list), combinations thereof, or the like. Thus, the API call can relate to programmatically actuating a new action, sending data, retrieving data, or other triggering actions that may be implemented over a computer network (e.g., accessing, creating, or modifying webhooks). Because other types of API calls can be triggered, it should be understood that the above examples are illustrative and should not be construed as being limiting in any way.

In some embodiments, as noted above, if the infringement detection system 102 confirms a potential infringement, the infringement detection system 102 can be configured to trigger an interaction with a database to create, read, modify, or delete a database entry. Thus, for example, the infringement detection system 102 can be configured to perform a database modification (create/replace/update/delete data in a database) in response to confirming the potential infringement. According to various embodiments of the concepts and technologies disclosed herein, the database that is modified by the infringement detection system 102 can relate to an allegation of potential infringement. According to various embodiments, the database can be directly connected to the infringement detection system 102 or can be located remotely. The database therefore can include a local device, a remote device, a virtual server, a memory, or one or more databases accessible via one or more APIs. Because other types of database modifications can be triggered, it should be understood that the above examples are illustrative and should not be construed as being limiting in any way.

In some embodiments, as noted above, if the infringement detection system 102 confirms a potential infringement, the infringement detection system 102 can be configured to draft and/or send a message (or to trigger other devices to draft and/or send a message). In particular, the infringement detection system 102 can be configured to compose a message (e.g., an email message containing a subject and a body) that details the detected potential infringement. The infringement detection system 102 also can be configured to deliver the message via a messaging system to one or more users, devices, and/or token addresses. The deliver-to addresses may be public addresses or private addresses, and can be contained in the database or looked up from an external directory or list, as part of a response action. In various embodiments, the message can include emails, text messages, short message service ("SMS") messages, multimedia message service ("MMS") messages, audio messages (e.g., recordings), in-game messages, calls or conversation entries, any of which may be composed using images, text, and/or metadata. In some embodiments, the messages can be combined with a textual template using conditional logic and/or can include a generated narrative (e.g., using natural language processing). The message can be created, in some embodiments, by a generative neural network, a text summarizer, a conversational artificial intelligence chatbot, or other technology (or combination of technologies) to communicate the substance and/or evidence of the potential infringement predictions to a recipient. Because other types of messages can be triggered, it should be understood that the above examples are illustrative and should not be construed as being limiting in any way.

In some embodiments, as noted above, if the infringement detection system 102 confirms a potential infringement, the infringement detection system 102 can be configured to draft, display, and/or send a report (or to trigger other devices to draft and/or send a report). In some embodiments, multiple instances of potential infringement can be compiled into a visualized report. The visualized report can include, in some embodiments, information that can identify the subjects of the potential infringement, owners of the product that potentially infringes, overlaps of potentially infringed intellectual property assets and/or products, text/image/price/location/history/ownership and/or other metadata associated with the potentially infringing entities, and/or other information relating to the potential infringements. In some embodiments, compilation of the report can include formatting textual information (e.g., using CSS style sheets, programmatic design using templates, and/or element positioning, etc.) to a predefined layout. In some embodiments, the reports can be shared in a number of ways including, but not limited to, graphical formats such as formatted emails and/or web pages, application pages, augmented reality displays, or the like; or can be formatted as tables, documents, databases, or other document formats (e.g., PDF files), among other reporting methods. Because other types of reports can be triggered, it should be understood that the above examples are illustrative and should not be construed as being limiting in any way.

In some embodiments, as noted above, if the infringement detection system 102 confirms a potential infringement, the infringement detection system 102 can be configured to create a log and/or a certificate (or to trigger other devices to create a log and/or a certificate). In some embodiments, the infringement detection system 102 can be configured to record, as legally verifiable attestations containing, e.g., witness credentials and digital signatures, a log and/or certificate that can be viewed as attesting to the potential infringement. In some embodiments, attestations may be constructed using, e.g., expert rules, natural language processing or narrative generation to integrate potential infringement data to prepare a compliant declaration, statement or certificate that can be ready to be signed, notarized, apostilled or the like in order to be accepted by a party who can act on the properly formatted evidence. Because other types of logs and/or certificates can be created in various embodiments of the concepts and technologies disclosed herein, it should be understood that the above examples are illustrative and should not be construed as being limiting in any way.

In some embodiments, as noted above, if the infringement detection system 102 confirms a potential infringement, the infringement detection system 102 can be configured to associate a particular potential infringement with a document (or to trigger other devices to associate a particular potential infringement with a document). For example, the infringement detection system 102 can be configured to associate a potential infringement prediction in a database (e.g., having a reference identifier, image, IP address, etc.) with one or more authoritative documents or records such as, for example, a business license (an original, certified or facsimile), a granted patent, a registered trademark, a registered copyright, a shipping manifest, a customs approval, a bill of lading, a notarized document, an apostille authentication, a passport, other documents, combinations thereof, or the like. Because other types of documents or records can be associated with the potential infringement in various embodiments of the concepts and technologies disclosed herein, it should be understood that the above examples are illustrative and should not be construed as being limiting in any way.

In some embodiments, as noted above, if the infringement detection system 102 confirms a potential infringement, the infringement detection system 102 can be configured to perform a transaction (or trigger other devices to perform a transaction). For example, the infringement detection system 102 can be configured to treat a detected potential infringement as a trigger for an automated offer such as, for example, a licensing offer. Thus, for example, the infringement detection system 102 can be configured to generate a licensing offer for a number of authorized units in a relevant territory; which can be priced as a running or prepaid royalty. Licensing offers can be output by the infringement detection system 102 in any form (e.g., text form, etc.) and can be directed to one or more seller addresses to obtain an expression of interest on the license offer. The seller addresses can be identified, for example, via an email lookup or through an integrated messaging system that can be provided by web platforms, social media networks, ecommerce marketplaces, and/or other entities that can maintain messaging systems and that can be associated with (or correspond to) a host of the potentially infringing activity.

In some other embodiments, a potential infringement match can initiate a buying transaction. For example, the infringement detection system 102 can be configured to purchase (e.g., as a test purchase or as an investment) an item, stock, financial security, or derivative that is associated with a potential infringement. In particular, in some embodiments the infringement detection system 102 can be trained to execute a purchasing or trading algorithm. Execution of the purchasing or trading algorithm can cause the infringement detection system 102 to acquire a financial security that could be an equity or a derivative of an equity or some other type of security (e.g., a bond or debt instrument). The purchasing or trading algorithm can take or obtain as input the detected infringement and/or a volume and/or a scope of infringement in making an investment decision for the security. These investment decisions can be calls or puts (buying or selling) and can be longs or shorts (decisions based on a long-term return and/or a short-term return). Thus, detection of a potential infringement can be used to trigger an investment decision based on the detected potential infringement and/or other parameters. Various parameters can be specified for the buying transaction such as, for example, price ranges, versions, availability, locations, terms, seller status, buyer status, and/or other factors. Test purchases can be performed by the infringement detection system 102 by constructing a purchase order (e.g., using a template) that can integrate potential infringement data with information for a product to be purchased, a quantity to be purchased, a price to be paid, a billing address, a shipping address, special instructions, combinations thereof, or the like. Purchase orders may be sent to marketplaces, merchants, buying services, or other entities that can specialize in test purchases, in some embodiments. Other buying, selling, trading, hedging, settlement, contractual, refusal, blockade, and/or negotiated transactions are possible as a transaction response action and are contemplated. Because other types of transactions can be performed in various embodiments of the concepts and technologies disclosed herein, it should be understood that the above examples are illustrative and should not be construed as being limiting in any way.

In some embodiments, as noted above, if the infringement detection system 102 confirms a potential infringement, the infringement detection system 102 can be configured to trigger a direct notification to one or more entities (e.g., stakeholders, or the like). In some embodiments, the infringement detection system 102 can be configured to trigger an immediate alert to one or more stakeholder. The alert can include match information and related metadata via any messaging technologies (e.g., emails, web browsers, SMS messages, MMS messages, push notifications, phone calls, other alerting services, combinations thereof, or the like). A direct notification can provide an alert to various entities (e.g., an operator of the infringement detection system 102, a rights owner or assignee, a government agency, a consortium manager, a website portal administrator, a third party, combinations thereof, or the like). Because other types of direct notifications and/or recipients of direct notifications are possible, it should be understood that the above examples are illustrative and should not be construed as being limiting in any way.

In some embodiments, as noted above, if the infringement detection system 102 does not confirm a potential infringement, the infringement detection system 102 can be configured to trigger issuance of an official registration. In particular, the infringement detection system 102 can be configured to provide outputs that indicate that no close match (e.g., no potential infringement) is found. This indication can be understood as corresponding to a positive sign (e.g., to prospective patentees if nothing matches their design, to prospective sellers as indicating no infringement, etc.). Furthermore, the infringement detection system 102 can enable automated (or semi-automated) filing of intellectual property registration documents for the non-infringing design. For example, if the infringement detection system 102 determines that no close match exists, the infringement detection system 102 can be configured to generate a filing or official registration for an intellectual property asset (e.g., a copyright, a trademark, a design patent, or the like). This filing can include predicted infringement match data and/or metadata associated with the match, relevant stakeholders and other identifying information required for a registration. Another official registration type may be related to an online registration portal dedicated to serving stakeholders of potential infringement, such as one operated by a marketplace brand alliance, a government customs agency, a law enforcement authority, a rights-granting body, a banking entity, a payment processing entity, combinations thereof, or the like. Because other types of official registrations can be created in various embodiments of the concepts and technologies disclosed herein, it should be understood that the above examples are illustrative and should not be construed as being limiting in any way.

In some embodiments, as noted above, if the infringement detection system 102 confirms a potential infringement, the infringement detection system 102 can be configured to create (or to trigger other devices to create) a legal comparison. According to various embodiments, a visualized fit can be formatted as a patent claim chart that can provide quantitative and/or qualitative evidence when considering the legal standard applicable (e.g., the "ordinary observer test" for design patents). In one example embodiments, a design patent claim chart can present legally claimed matter (e.g., numbered line drawing figures) side-by-side with (and/or overlaid upon) a potentially infringing product photo. Alternatively, the visualized fit can include instructions for an augmented reality viewing system to display other metadata (e.g., patent or product information) anchored to the same tight fit region. Because other types of legal comparisons can be created in various embodiments of the concepts and technologies disclosed herein, it should be understood that the above examples are illustrative and should not be construed as being limiting in any way.

In some embodiments, as noted above, if the infringement detection system 102 confirms a potential infringement, the infringement detection system 102 can be configured to create (or to trigger other devices to create) a ledger entry and/or to validate a distributed ledger entry. One way to deter counterfeits can include providing product manufacturing and chain-of-ownership logistics data that can be shared via a public or private distributed ledger and/or shared via a smart contract stored on a blockchain. Data elements of a blockchain can be selectively encrypted and then accessed by multiple parties in a trusted manner, thus enabling product and consumer stakeholders with appropriate keys to obtain reliable information at any time (e.g., using QR codes). Potential infringement matches can trigger a response action that a) checks other blockchains to further confirm the allegation and/or b) reports potential infringements to a distributed ledger on a blockchain by contributing a block to the network containing properly hashed information. Because other types of create/validation distributed ledger entries can be created in various embodiments of the concepts and technologies disclosed herein, it should be understood that the above examples are illustrative and should not be construed as being limiting in any way.

In some embodiments, as noted above, if the infringement detection system 102 confirms a potential infringement, the infringement detection system 102 can be configured to trigger an AI chatbot communication. In particular, the infringement detection system 102 can be configured to trigger messaging (e.g., ongoing messaging, discrete messaging, and/or responsive messaging). The messaging can be between a deep-learning-trained artificially intelligent computerized assistant and a third party in order to communicate the prediction, allegation and/or data from the infringement detection system 102. AI chatbots may engage in messaging, reporting, transactions and other activities in communication with a receiving stakeholder. Conversations from the AI chatbot may be captured for continuous deep learning, with the deep learning being adjusted, adapted, triggered, and/or terminated, and/or adding new actions based on learned responses. Because other types of AI chatbot communications can be triggered in various embodiments of the concepts and technologies disclosed herein, it should be understood that the above examples are illustrative and should not be construed as being limiting in any way.

In some embodiments, as noted above, if the infringement detection system 102 confirms a potential infringement, the infringement detection system 102 can be configured to trigger an augmented reality rendering. In particular, upon a predicted infringement match, a matching drawing can be overlaid on other images being viewed (e.g., images that can be projected or captured by a camera/imager in a computing device, or the like). Automatically overlaying objects can occur through augmented reality glasses, headsets, visors, projectors, holography, other wearables, or the like. Because other types of augmented reality views can be created in various embodiments of the concepts and technologies disclosed herein, it should be understood that the above examples are illustrative and should not be construed as being limiting in any way.

Briefly, then, the infringement detection system 102 illustrated and described herein can perform an infringement analysis. In some embodiments, a user or other entity can identify an intellectual property asset (e.g., a design patent, a trade dress registration, a copyright, a trademark, a mask work or other semiconductor image, or the like) as input (e.g., a patent number, the uploading of a file corresponding to the patent such as a PDF of the patent, or the like). The infringement detection system 102 can identify a domain of interest based on input and/or based on the identified intellectual property asset (e.g., the infringement detection system 102 can be configured to detect, to determine, and/or to look up a classification associated with the patent, an international class of goods and services, a description of goods, combinations thereof, or the like).

The domain of interest can help focus and/or can limit the image search that is performed by the infringement detection system 102. By way of example, the domain of interest can be defined as "shoes." Based on the determined domain of interest, the infringement detection system 102 can obtain (e.g., by way of queries, service calls, requests, commands, or the like) product images 110 from multiple product image sources 112. In some other embodiments, the infringement detection system 102 can begin its analysis with a product image 110 (e.g., a photograph, a sketch, a live scanner or x-ray imager, etc.) and can be configured to determine the domain of interest based on the product image 110, and to obtain patent drawings 122 (or other reference images) based on the domain of interest. Thus, the infringement detection system 102 can obtain one or more product image 110 and one or more instance of patent data 116 that includes at least one patent drawing 122, in either order, and begin the analysis to determine if any potential infringement is detected. It should be understood that this example is illustrative, and therefore should not be construed as being limiting in any way.

According to various embodiments, the infringement detection system 102 can also obtain one or more authentic product images associated with a particular product and/or patent that has been identified as being associated with the one or more product image 110 and/or patent drawing 122 for purposes of training the infringement detection system 102 and/or for other purposes, though this training can happen at almost any time and need not occur after the product image 110 and/or the patent drawings 122 are obtained. Thus, it can be appreciated that the infringement detection system 102 can be trained at any time and need not perform training during a particular infringement analysis and/or infringement search.

In various embodiments of the concepts and technologies disclosed herein, the infringement detection application 108 can be configured as a trainable application that can use machine learning to improve its search and identification processes. In various embodiments, the infringement detection application 108 can operate and/or can be provided by one or more neural networks 124 such as, for example, a siamese neural network, as noted above. In one embodiment of the concepts and technologies disclosed herein, the infringement detection application 108 can operate as and/or can be provided by a siamese convolutional neural network that can use shared embedding using triplet loss. Of course future evolution of these networks can provide enhancements to the concepts and technologies disclosed herein, and therefore the use of this type of neural network 124 to provide the infringement detection application 108 should be understood as being an illustrative example and therefore should not be construed as being limiting in any way. In some embodiments, the infringement detection application 108 can use authentic product images 110 to train and/or learn how to match specific types of images and/or specific images to patent drawings 122. It should be understood that this example is illustrative, and therefore should not be construed as being limiting in any way.

The infringement detection application 108 can perform a coarse match operation wherein the one or more product image 110 is compared to one or more patent drawings 122 (or vice versa). During the coarse match operation, therefore, the infringement detection application 108 can identify, among the patent drawings 122 compared to the product image 110, a patent drawing 122 that is the best match identified. It can be appreciated that the phrase "best match" as used herein can refer to a single patent drawing 122 from one or more patents, where the "best match" patent drawing 122 can correspond to the drawing from these one or more patents that is the most likely to be infringed by the product image 110. Of course, as can be appreciated to one reading the entire disclosure, the "best match" patent may nonetheless be determined to not be infringed by the product represented by the product image 110 during additional analysis, as will be determined in a refined analysis operation.

The closest coarse match can be output for additional analysis and/or shape fitting, as will be explained in more detail below. According to various embodiments of the concepts and technologies disclosed herein, the infringement detection system 102 can be configured to always output a best match at the coarse matching operation. Thus, output from the coarse matching operation can include the infringement detection system 102 identifying a patent associated with the closest matching patent drawing 122 and the infringement detection system 102 can proceed to another level of analysis, also referred to herein as a match refinement. In some embodiments, the infringement detection system 102 can be configured to determine that there is no coarse match and can take other operations as will be explained hereinbelow. It should be understood that these examples are illustrative, and therefore these features should not be construed as being limiting in any way.

Upon identifying the "best match," the infringement detection application 108 can perform an image augmentation and transformation process to begin a match refinement stage of the analysis or to begin preparing for the match refinement stage of analysis. In particular, the infringement detection application 108 can perform drawing augmentation and transformation on the patent drawings 122 and product images 110. In particular, as is generally known, patent drawings 122 can include relevant matter (relevant to an infringement analysis) and in some instances, the patent drawings 122 also can include irrelevant matter (matter that is not relevant to an infringement analysis). Relevant matter in patent drawings 122 can be denoted by way of solid lines and irrelevant matter (if included) can be denoted by broken lines in patent drawings 122.

Additionally, a particular drawing from a patent can represent a first view of the subject matter of the patent drawing 122. A particular patent can include multiple views of the subject matter of the patent drawing 122. Thus, the infringement detection application 108 can be configured to augment and/or transform the patent drawings 122 by adding additional patent drawings 122 associated with a particular patent and by eliminating, from the multiple patent drawings 122, irrelevant matter. It should be understood that this example is illustrative, and therefore should not be construed as being limiting in any way.

With regard to the product images 110, the infringement detection application 108 can be configured to perform various operations on the product images 110 such as, for example, edge detection, thresholding, and/or other operations. These operations can be performed to transform the product images 110 into a format that may be more efficient for the comparisons illustrated and described herein. Some example embodiments of the image transformation will be illustrated and described in more detail hereinbelow.

The infringement detection application 108 can compare the augmented and/or transformed patent drawings 122 to the augmented and/or transformed product images 110 to perform a shape fitting process. The infringement detection application 108 can perform the shape fitting process to determine if there is a potential infringement, by a product represented by the product images 110, of the patent represented by the patent drawings 122. The shape fitting can be performed by attempting to match the augmented and/or transformed patent drawings 122 to the augmented and/or transformed product images 110. In some embodiments of the concepts and technologies disclosed herein, the infringement detection application 108 can be configured to build a three dimensional model of the product or the patented object using the transformed product images 110 and/or the augmented patent drawings 122 and to manipulate the three dimensional model to approximate the compared images (thereby enabling easier and/or more efficient analysis when, for example, a view of a patent drawing 122 does not match a view in a product image 110). Thus, the shape fitting described herein can be performed by attempting to overlay drawings, by matching three dimensional structures, and/or otherwise matching the product images 110 and the patent drawings 122.

If the shape fitting process reveals a match between the product images 110 and the patent drawings 122, the infringement detection system 102 can also perform a confirmation analysis as explained in detail above. If the confirmational analysis confirms the potential infringement, the infringement detection system 102 can take various response actions such as generating documents, generating alerts, filing complaints, combinations thereof, or the like. If the confirmational analysis does not confirm the potential infringement, the infringement detection system 102 can take other response actions such as outputting a certificate (e.g., a non-infringement certificate), generating alerts, combinations thereof, or the like.

In some embodiments, the infringement detection system 102 generates an alert, notice, result, score, value, or other type of output (hereinafter "output") 130. The infringement detection system 102 can be configured to provide the output 130 to one or more recipients and/or devices. The output 130 can be used to prompt various actions for follow up, to alert owners or other entities about the potential infringement, to begin a confirmation analysis, and/or for other purposes as will be illustrated and described herein. If the infringement detection system 102 determines that a match has not been identified between the product image 110 and the patent data 116, the infringement detection system 102 can determine that no infringement or potential infringement is found. It should be understood that this example is illustrative, and therefore should not be construed as being limiting in any way.

Although FIG. 1 illustrates and describes comparing product images 110 to patent drawings 122, it should be understood that the concepts and technologies disclosed herein can be used to compare product images 110 to trade dress images, trade dress drawings, and/or other forms of drawings in addition to, or instead of, the patent drawings 122. In particular, trade dress images and/or drawings can be similar, in some instances, to patent drawings 122 including, among other things, the use of solid lines, broken lines (e.g., dashed lines, hatched lines, dotted lines, center lines, phantom lines, hidden lines, etc.) to claim/disclaim matter, and the like. Thus, the concepts and technologies disclosed herein can be used to detect not only patent infringement, but also trademark infringement, trade dress infringement, and/or other types of intellectual property infringement, in some embodiments. Also, some embodiments of the concepts and technologies disclosed herein can compare product images 110 to mask works, for example, to determine if a particular semiconductor or other device infringes a mask work. It should be understood that this example is illustrative, and therefore should not be construed as being limiting in any way.

FIG. 1 illustrates one infringement detection system 102, one network 104, four product image sources 112, three patent data sources 118, and one recipient 132. It should be understood, however, that various implementations of the operating environment 100 can include one or more than one infringement detection system 102; zero, one, or more than one network 104; one or more than one product image sources 112; one or more than one patent data sources 118; and/or zero, one, or more than one recipient 132. As such, the illustrated embodiment should be understood as being illustrative, and should not be construed as being limiting in any way.

Figure 2A:
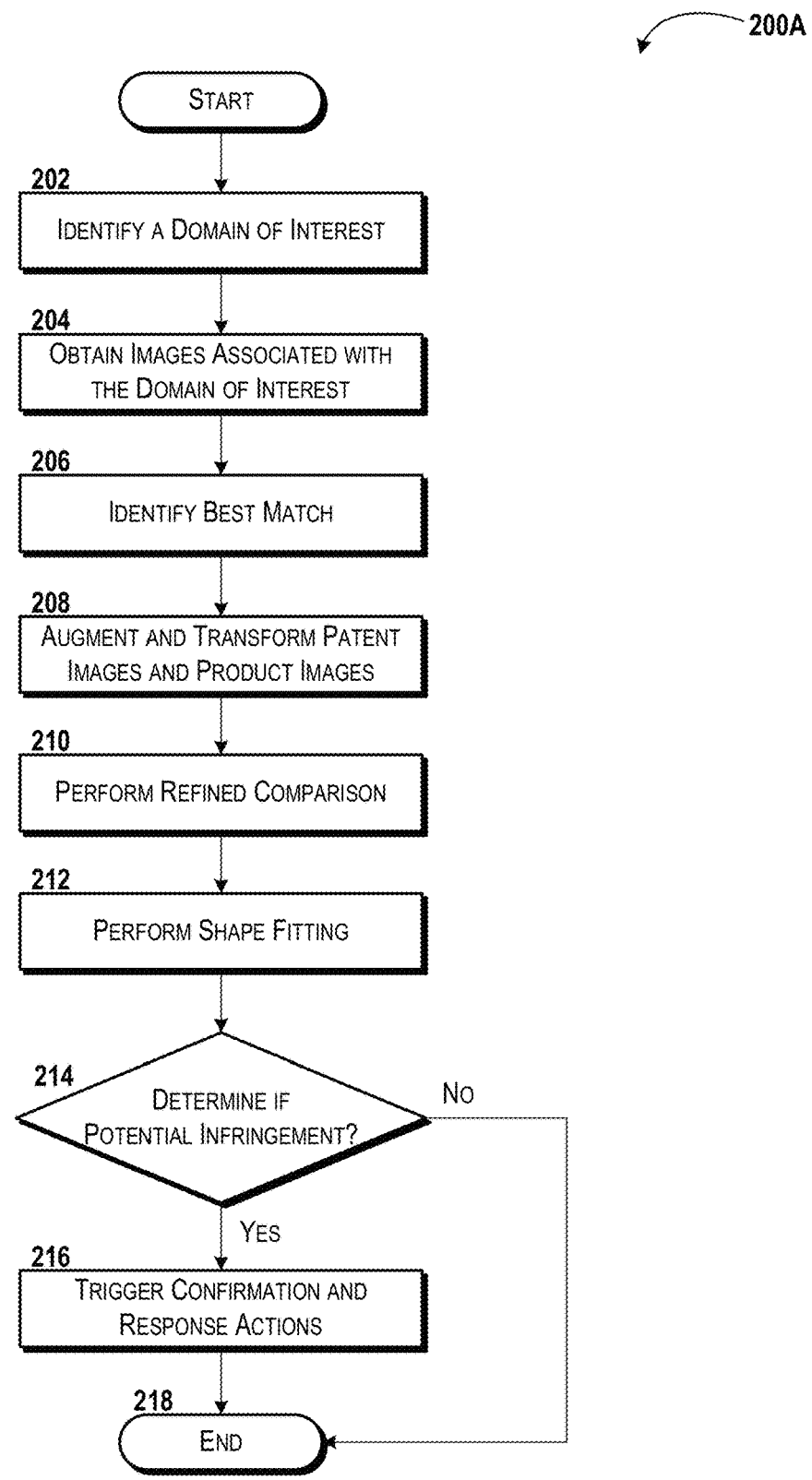
FIG. 2A is a flow diagram showing aspects of a method for identifying a potentially infringing product using an infringement detection system, according to an illustrative embodiment of the concepts and technologies described herein.

Turning now to FIG. 2A, aspects of a method 200A for identifying a potentially infringing product using an infringement detection system 102 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, wearable devices, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the infringement detection system 102, to perform one or more operations and/or causing the processor to direct other components of the computing system or device to perform one or more of the operations.

For purposes of illustrating and describing the concepts of the present disclosure, the method 200A is described herein as being performed by the infringement detection system 102 via execution of one or more software modules such as, for example, the infringement detection application 108. It should be understood that additional and/or alternative devices and/or network nodes can provide the functionality described herein via execution of one or more modules, applications, and/or other software including, but not limited to, the infringement detection application 108. Thus, the illustrated embodiments are illustrative, and should not be viewed as being limiting in any way.

The method 200A begins at operation 202. At operation 202, the infringement detection system 102 can identify a domain of interest. According to various embodiments of the concepts and technologies disclosed herein, the infringement detection system 102 can be configured to provide a portal and/or other functionality to enable a user or other entity to interact with the infringement detection system 102 to specify a domain of interest. In some other embodiments, the infringement detection system 102 can be configured to receive or otherwise obtain an indication of a patent or product, and the infringement detection system 102 can determine, based on the indication and/or based on the patent or product, the domain of interest (e.g., a patent number can be entered and the infringement detection system 102 can determine a classification associated with the patent). Because the domain of interest can be determined in various manners as illustrated and described herein, it should be understood that the above examples are illustrative and should not be construed as being limiting in any way.

In some embodiments, the domain of interest can be specified broadly or narrowly. In the example mentioned several times herein, where the domain of interest is shoes, a domain of interest can be specified broadly or narrowly as, for example, "footwear," "men's footwear," "women's footwear," "men's shoes," "women's shoes," "women's high heel shoes," "women's open toe high heel shoes," or the like. Thus, it can be appreciated that the domain of interest can affect the amount of analysis and/or searching that the infringement detection system 102 will perform by narrowing or broadening the domain of interest, in some embodiments. It should be understood that this example is illustrative, and therefore should not be construed as being limiting in any way.

In some embodiments of the concepts and technologies disclosed herein, the domain of interest can be selected from specified domains of interest such as, for example, items listed in patent classifications and/or sub-classifications (e.g., the cooperative patent classification ("CPC") system, the US patent classification ("USPC") system, or other classification systems), by accessing a trademark manual of classification, by accessing lists of items in specified international classes of trademark goods and services (e.g., the Nice classification system ("NCL") or other classification system), combinations thereof, or the like. Thus, in some embodiments of the concepts and technologies disclosed herein, operation 202 can correspond to the infringement detection system 102 obtaining, through a portal, request, service call, and/or other functionality, a designation or identification of the domain of interest. It should be understood that this example is illustrative, and therefore should not be construed as being limiting in any way.

From operation 202, the method 200A can proceed to operation 204. At operation 204, the infringement detection system 102 can obtain (e.g., retrieve, request, access, receive, or otherwise obtain) images associated with the domain of interest specified in operation 202. Thus, it can be appreciated that in operation 204, the infringement detection system 102 can obtain one or more product image 110 from one or more product image sources 112, and that the infringement detection system 102 can obtain one or more instances of patent data 116 (including at least one patent drawing 122) from the one or more patent data sources 118.

As explained above, the product image sources 112 illustrated and described herein can include a computerized image generation source such as, for example, a generative neural network, a CAD model, a LIDAR image capture, a video gaming world, combinations thereof, or the like. Additionally, or alternatively, the product image sources 112 illustrated and described herein can include an image supply source such as, for example, document image collections; collectible image collections; Internet web sites (e.g., Internet addresses of website pages or marketplaces that promote and/or offer products and content for sale, social media, search engines, websites; photo, video and animation databases, or the like); or other sources. Thus, obtaining the product image 110 and/or the patent data 116 (e.g., the patent drawing 122) can include receiving output from various computing environments, services, devices, systems, or the like.

As noted above, the infringement detection system 102 can obtain the one or more product image 110 in response to the infringement detection system 102 sending, to the one or more product image sources 112, a product image request 114, which can include and/or can specify the domain of interest identified in operation 202. As explained above, the infringement detection system 102 can interact with the one or more product image sources 112 and/or patent data sources 118 by way of service calls (e.g., via one or more APIs), via queries (e.g., SQL queries, search strings, etc.), and/or via other communications with or without explicit requests being generated and/or sent. Thus, it can be appreciated that in various embodiments of the concepts and technologies disclosed herein, the infringement detection system 102 can obtain the product images 110 via automated processes such as crawling, scraping, uploading, mobile-device-capture, frame-capture, X-ray scan, CT-scan, laser-scan, holography and images digitally acquired by other methods from other sources such as, for example, requests, service calls, queries, combinations thereof, or the like. Because the product images 110 can be obtained in additional and/or alternative manners, these example embodiments should be understood as being illustrative of the concepts and technologies disclosed herein and should not be construed as being limiting in any way.

Similarly, the infringement detection system 102 can obtain the patent data 116 from the patent data sources 118 by way of the infringement detection system 102 sending, to the one or more patent data sources 118, one or more patent data requests 120 and/or in other manners as illustrated and described herein. As noted above, the one or more patent data requests 120 can include and/or can specify the domain of interest identified in operation 202. The patent data sources 118 can contain any reference set of images owned by a rights-controlling party such as, for example, patent drawings 122 for a particular patent, trade dress drawings for a particular trade dress registration, a diagram for a particular mask work, or the like. In some embodiments, a patent, trademark, copyright or design corpus from a rights-granting authority can correspond to one or more of the patent data sources 118 and therefore can be the source of the patent drawings 122 (or other intellectual property right drawings or images as illustrated and described herein).

The patent drawings 122 may relate to other patent drawings 122 (e.g., a first patent drawing 122 on one page of a patent may be related to additional patent drawings 122 on other pages of the same patent, etc.). Similarly, patent drawings 122 may be related in that the patent drawings may be contained within a single trademark image or may be included in a single copyrighted video frame or may be contained in an augmented version of a patent drawing 122 that is identical to or associated with a patent drawing 122. The patent data sources 118 may also contain category information, unique identifiers, bibliometric data, legal status data, family data, full text data, translated data, and NLP-extracted data about the image, as explained above with regard to the ownership data 126, the other data 128, and/or other aspects of the patent data sources 118. These and other types of information and/or imagery can be obtained in operation 204, according to various embodiments of the concepts and technologies disclosed herein.

From operation 204, the method 200A can proceed to operation 206. At operation 206, the infringement detection system 102 can identify a coarse match (e.g., an optimal match) using the one or more product images 110 and the one or more patent drawings 122. Thus, in operation 206 the infringement detection system 102 can compare the product images 110 to one or more patent drawings 122 to determine which of the patent drawings 122 is the closest match (e.g., the optimal match) to the product image 110 meaning, for example, which of the patent drawings 122 is most likely to be infringed among the patent drawings 122 based on the product image 110. Thus, a coarse match can be understood as referring to a patent drawing 122 that is determined by the infringement detection system 102 as being the most likely to be infringed patent drawing among the patent drawings 122 considered by the infringement detection system 102. It should be understood that this example is illustrative, and therefore should not be construed as being limiting in any way.

According to various embodiments, the infringement detection system 102 can use an image comparison operation (or can trigger an image comparison engine) to compare the one or more product image 110 and the one or more patent drawings 122 to find the coarse match. Again, the "coarse match" can correspond to a patent drawing 122 that has a greatest amount of similarity to a product image 110 and/or the greatest odds of being infringed. Therefore, it can be appreciated that the "coarse match" can correspond, in various embodiments, to a patent that is most-likely-to-be-infringed by the product represented by the product image 110 from among a set of patents represented by the patent drawings 122. As noted above, the infringement detection system 102 can access and/or can include a siamese convolutional neural network that can provide the image comparison associated with operation 206 to identify the coarse match. In some embodiments, the infringement detection system 102 can output one or more vectors, values or scores for each considered pair of images (e.g., a first pair can correspond to a particular patent drawing 122 and a first product image 110 and a second pair can correspond to the same patent drawing 122 and a second product image 110). The image pair that corresponds to the vector, value or score indicating the highest level of similarity can be determined as the "best match." It should be understood that this example is illustrative, and therefore should not be construed as being limiting in any way.

Although not separately illustrated in FIG. 2A, it can be appreciated that output from operation 206 can correspond, in some embodiments, to a potential infringement prediction. Based on the identified coarse match, the infringement detection system 102 can identify a patent associated with the patent drawing 122 determined to be the coarse match and can push or elevate that patent and the product image 110 to a second level of analysis and/or match refinement as illustrated and described herein. It should be understood that this example is illustrative, and therefore should not be construed as being limiting in any way.

From operation 206, the method 200A can proceed to operation 208. At operation 208, the infringement detection system 102 can augment and/or transform the patent drawings 122 and the product images 110. As explained above, operation 208 can include the infringement detection system 102 adding patent drawings 122 for the refined matching process. Thus, the infringement detection system 102 can identify the patent associated with the patent drawing 122 identified as the coarse match in operation 208 and obtain, from the one or more patent data sources 118, additional patent drawings 122 from the associated patent. The additional patent drawings 122 obtained in operation 208 can correspond to additional views and/or embodiments, in some implementations. Thus, operation 208 can include the infringement detection system 102 adding additional views and/or additional embodiments for analysis in a refined matching stage of the analysis. It should be understood that this example is illustrative, and therefore should not be construed as being limiting in any way.

Additionally, or alternatively, the augmentation and/or transformation of the patent drawings 122 can include removing irrelevant matter from the patent drawings 122 for the refined matching analysis. For example, broken lines (e.g., dashed lines, hatched lines, dotted lines, center lines, phantom lines, hidden lines, etc.) in some patent drawings 122 can be used to denote unclaimed matter. The unclaimed matter, however, may aid in context and therefore may be considered by the infringement detection system 102 during the coarse match illustrated and described herein. Thus, retaining subject matter denoted by (e.g., bound by) broken lines (e.g., dashed lines, hatched lines, dotted lines, center lines, phantom lines, hidden lines, etc.) in the patent drawings 122 can help during the coarse match operation, but may negatively impact the refined matching phase. Thus, the subject matter determined to be irrelevant or unclaimed may be removed for the refined matching phase to improve results of the refined matching. In some embodiments, the patent drawings 122 may be processed by a broken line detection algorithm or another neural network 124.

In particular, the infringement detection system 102 can employ a broken line detection algorithm that can be configured to calculate the distances between, and angles of, broken lines (e.g., dashed lines, hatched lines, dotted lines, center lines, phantom lines, hidden lines, etc.). In some embodiments, the broken line detection algorithm can use a line-segment slope angle threshold to determine how much two line segments angles can vary from one another, while still being connected. Also, the broken line detection algorithm can use a line-segment gap distance threshold to determine how far apart (e.g., in terms of Euclidian distance) the line segments can be separated yet still be connected. These and/or other algorithms can be used by the infringement detection system 102 to analyze the lines in a patent drawing 122.

In some embodiments, the infringement detection system 102 can include another neural network 124, trained on ground truth from the broken line detection algorithm, that may be utilized to predict broken line regions. Pixel regions within the detected line segments can be removed from the patent drawings 122 and/or from consideration, colored white, a background color, a median color, or another color to aid in refined matching. It should be understood that this example is illustrative, and therefore should not be construed as being limiting in any way.

As noted above, operation 208 also can include product image 110 augmentation and/or transformation. In particular, the infringement detection system 102 can be configured to transform the product image 110 to more closely resemble a line drawing. This transformation of the product image 110 can be performed to enable and/or to make more efficient the comparison of the product image 110 and the patent drawing 122.

In operation 208, the infringement detection system 102 can modify the product image 110 to more closely resemble a line drawing to heighten the sensitivity of the matching operation. According to various embodiments, the infringement detection system 102 can transform the product image 110 in operation 208 by using various thresholding methods such as adaptive; mean; Gaussian; binarization, combinations thereof, or the like. The thresholding operations can be used by the infringement detection system 102 to essentially convert the product images 110 to line drawings (e.g., in the black-and-white domain). The infringement detection system 102 can use edge detection to identify boundaries of brightness change to obtain edge maps that closely resemble line drawings (and therefore may closely resemble the patent drawings 122). The infringement detection system 102 can use various edge detection algorithms such as, for example, Canny; Sobel; Structured Forest; Holistically-Nested; or others. Thus, in operation 208, the infringement detection system 102 can obtain augmented patent drawings 122 and transformed and/or augmented product images 110, the style of which may closely resemble the style of patent drawings 122. It should be understood that this example is illustrative, and therefore should not be construed as being limiting in any way.

From operation 208, the method 200A can proceed to operation 210. At operation 210, the infringement detection system 102 can perform a refined comparison operation, wherein the augmented patent drawings 122 and the transformed product images 110 can be compared to one another to determine if a match exists. In some embodiments, the infringement detection system 102 can perform a drawing to photo comparison; a drawing to drawing comparison; a photo to drawing comparison; and a photo to photo comparison. It should be understood that this example is illustrative, and therefore should not be construed as being limiting in any way.

From operation 210, the method 200A can proceed to operation 212. At operation 212, the infringement detection system 102 can perform a shape fitting operation. The infringement detection system 102 can determine if the augmented and/or transformed patent drawings 122 match the augmented and/or transformed product images 110. The infringement detection system 102 can output a value, vector, score, embedding distance, and/or other indicator that can indicate the results of the shape fitting. An output that indicates a high degree of similarity (e.g., a low embedding distance, a short vector, etc.) may indicate that the infringement detection system 102 has identified a "tight fit" between the product images 110 and the patent drawings 122. It should be understood that this example is illustrative, and therefore should not be construed as being limiting in any way.

In some embodiments, the infringement detection system 102 can output the value with a photograph of the product represented by the product image 110 in a visualization (e.g., a user interface display). Thus, a tight fitting drawing photo pair may be presented to illustrate confusing similarity to an ordinary observer. In some embodiments, the visualization can include, for example, a false-colored overlay depicting at least one suspect refined matched patent drawing 122 in position over at least one refined-matched product image 110. It should be understood that this example is illustrative, and therefore should not be construed as being limiting in any way.

In some embodiments of operation 212, the infringement detection system 102 can use a robust modified Hausdorff distance that can include a shape detection algorithm that can measure an extent to which each point of a "model" set of points can lie near some point of an "image" set and vice versa. A Hausdorff distance algorithm has several variants (e.g., a least trimmed square variant and other variants) that can be used for images with occlusions and noise such as some instances of the augmented and/or transformed product images 110 and/or the augmented and/or transformed patent drawings 122 as illustrated and described herein. The Hausdorff distance values may be compared to one or more learned or arbitrary values stored by and/or accessible to the infringement detection system 102 to indicate a tight fit, meaning that confusing similarity could be the result when a typical ordinary observer views the matched image photo pair. The values and/or thresholds used to determine a "tight fit" can be learned by the infringement detection system 102, for example by using triplet training where the infringement detection system 102 is trained to minimize the distance (e.g., a Euclidean distance or Cosine distance) from an anchor of a triplet to the positive of the triplet, and maximizing the distance (e.g., a Euclidean distance or Cosine distance) from the anchor of the triplet to the negative of the triplet. It should be understood that this example is illustrative, and therefore should not be construed as being limiting in any way. According to various embodiments of the concepts and technologies disclosed herein, the image and metadata elements of each tight fit image photo pair may be considered as counterfeit candidates and/or the composite match values can be considered as refined infringement predictions. It should be understood that this example is illustrative, and therefore should not be construed as being limiting in any way.

In some embodiments, the infringement detection system 102 (or another trained device that can include or can correspond to a siamese neural network) can perform the shape fitting of operation 210. For example, the infringement detection system 102 can use a generative-adaptive neural network 124 that can propose ever-newer and tighter shape fits in some embodiments. Also, the infringement detection system 102 can use a recurrent neural network 124 that may be ideal for a sequence of images in video. Thus, the infringement detection system 102 can output a fit prediction between a patent drawing 122 and product image 110 (e.g., as a vector or embedding distance) that may further enable generation of a composite image depicting the predicted best fit. It should be understood that this example is illustrative, and therefore should not be construed as being limiting in any way.

From operation 212, the method 200A can proceed to operation 214. At operation 214, the infringement detection system 102 can determine, based on the refined comparison and shape fitting analyses illustrated and described above, if a potential infringement exists, e.g., if the product depicted in the transformed product image 110 potentially infringes a patent represented by the augmented patent drawings 122. In operation 214, then, the infringement detection system 102 can determine if the optimal match identified in the coarse match stage can still be determined (e.g., quantified) as still being optimal after a shape fitting analysis and/or other refined comparison. Thus, it can be appreciated that operation 214 can correspond to the infringement detection system 102 determining if the optimal match (coarse match) determined in operation 206 remains optimal (e.g., remains the optimal match) after the refined comparison. It can be appreciated that operation 214 can correspond to the infringement detection system 102 determining if the value or score output in the shape fitting of operation 212 represents a tight fit or other-than-tight fit. Because the infringement detection system 102 can determine if a potential infringement exists in additional and/or alternative manners, it should be understood that this example is illustrative, and therefore should not be construed as being limiting in any way.

Figure 3:
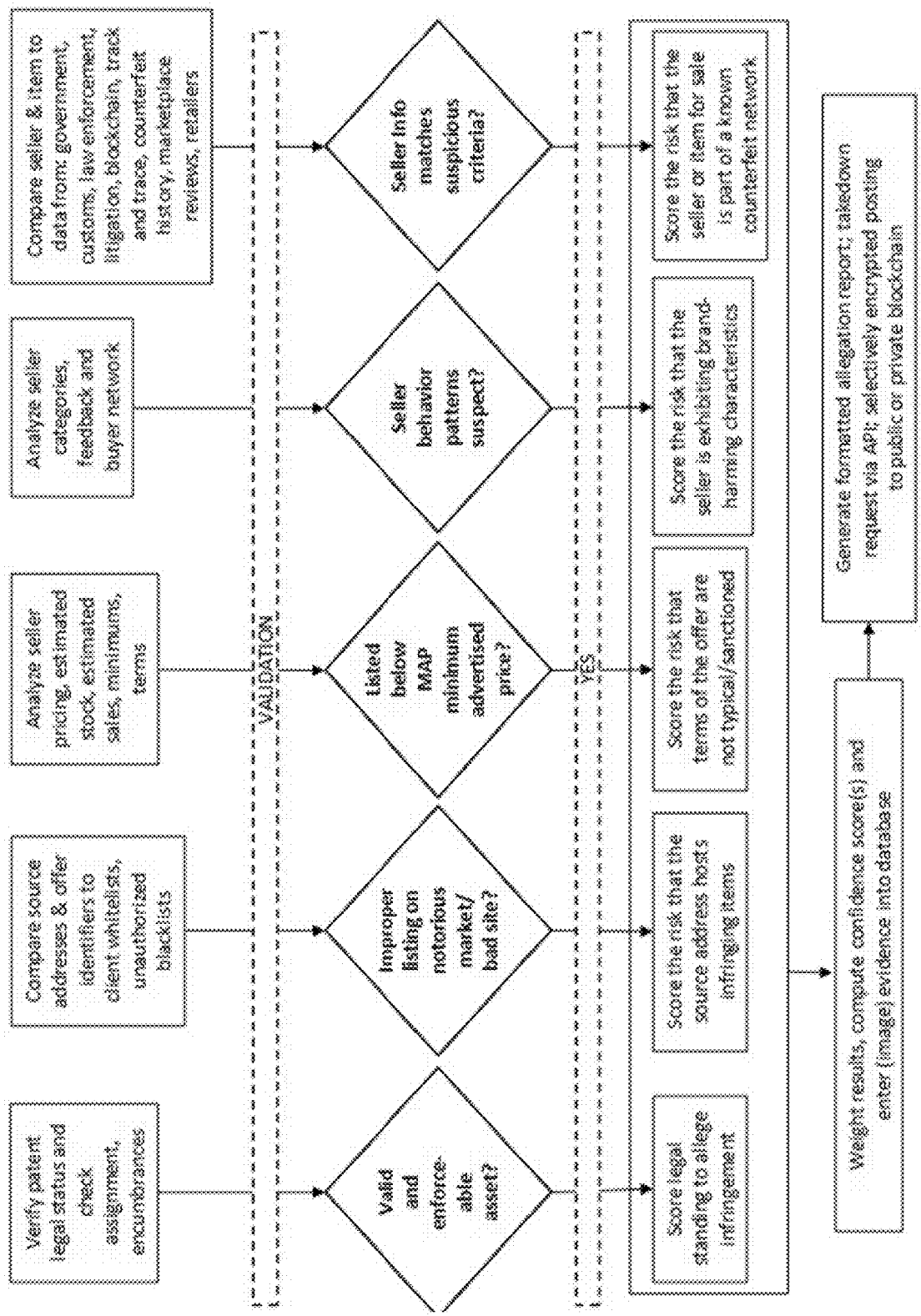
FIG. 3 schematically illustrates some aspects of an example method for performing a confirmational analysis using an infringement detection system, according to an illustrative embodiment of the concepts and technologies disclosed herein.

If the infringement detection system 102 determines, in operation 214, that a potential infringement does exist, the method 200A can proceed to operation 216. At operation 216, the infringement detection system 102 can trigger confirmation and response actions. As noted above, the infringement detection system 102 can perform a confirmational analysis for potential infringements. The confirmational analysis can include, for example, checks of counterfeit clues that can be associated with refined infringement predictions. The infringement detection system 102 can, for example, perform a legal metadata analysis in which the infringement detection system 102 can determine if the matched patent is enforceable with proper legal status in a relevant geographic territory (e.g., by accessing ownership data 126 and other data 128 that can indicate, for example, maintenance fee payment status, legal proceedings information, IPR information, etc.); an authentic product check (e.g., is a product associated with the product image 110 listed on any suspected infringer lists such or sites or otherwise associated with a known infringer such as, for example, a notorious/blacklist/whitelist/suspect location/market/site/IP address/blockchain); a price and/or terms check in which the infringement detection system 102 can determine if a product that is suspected as an infringing product is priced less than a known minimum advertised price or does a vendor's estimated stock, estimated sales, minimums, quantities on hand, or other information fail to comport with expected figures such as these; a behavior check in which the infringement detection system 102 can determine if the seller is active in unauthorized categories of sales and/or has been associated with negative feedback; a text and image anomaly check in which the infringement detection system 102 can determine if an associated image or text item include misspelled words, inappropriate trademarks, or unacceptable ad claims; and a known counterfeit associations check in which the infringement detection system 102 can determine if the seller information matches prior identified suspicious criteria, if the seller is part of a suspect network under investigation, and/or if seller IDs, analytics codes and other identifiers have been associated with public or blockchain-listed infringement activity. These and other checks can be performed by the infringement detection system 102 and the results can be analyzed to support or challenge the infringement finding. An example schematic flow diagram of one embodiment of the confirmation analysis is illustrated in FIG. 3. It should be understood that this example is illustrative and should not be construed as being limiting in any way.

Operation 216 also can include one or more response actions. As explained in detail above with reference to FIG. 1, the response actions can include, but are not limited to, the infringement detection system 102 taking or triggering various responses to the detected infringement. The various responses can include, but are not limited to, the infringement detection system 102 generating an API call; modifying or entering data into a database; drafting and/or sending a message or alert; drafting and/or sending a report; creating a log or certificate, associating information in a database; performing a transaction; generating a direct notification; generating an official registration; creating an accurate legal complaint; creating and/or validating a distributed ledger entry; creating an artificial intelligence ("AI") chatbot communication; creating an augmented reality rendering; or taking additional and/or alternative actions. It should be understood that in some embodiments of the concepts and technologies disclosed herein, the confirmational analysis itself, e.g., the confirmational analysis illustrated and described herein, can be one of the response actions. Because other response actions can be taken, it should be understood that these examples are illustrative, and therefore should not be construed as being limiting in any way.

From operation 216, the method 200A can proceed to operation 218. The method 200A also can proceed to operation 218 from operation 214 if the infringement detection system 102 determines, in operation 214, that a potential infringement does not exist. The method 200A can end at operation 218.

Figure 2B:
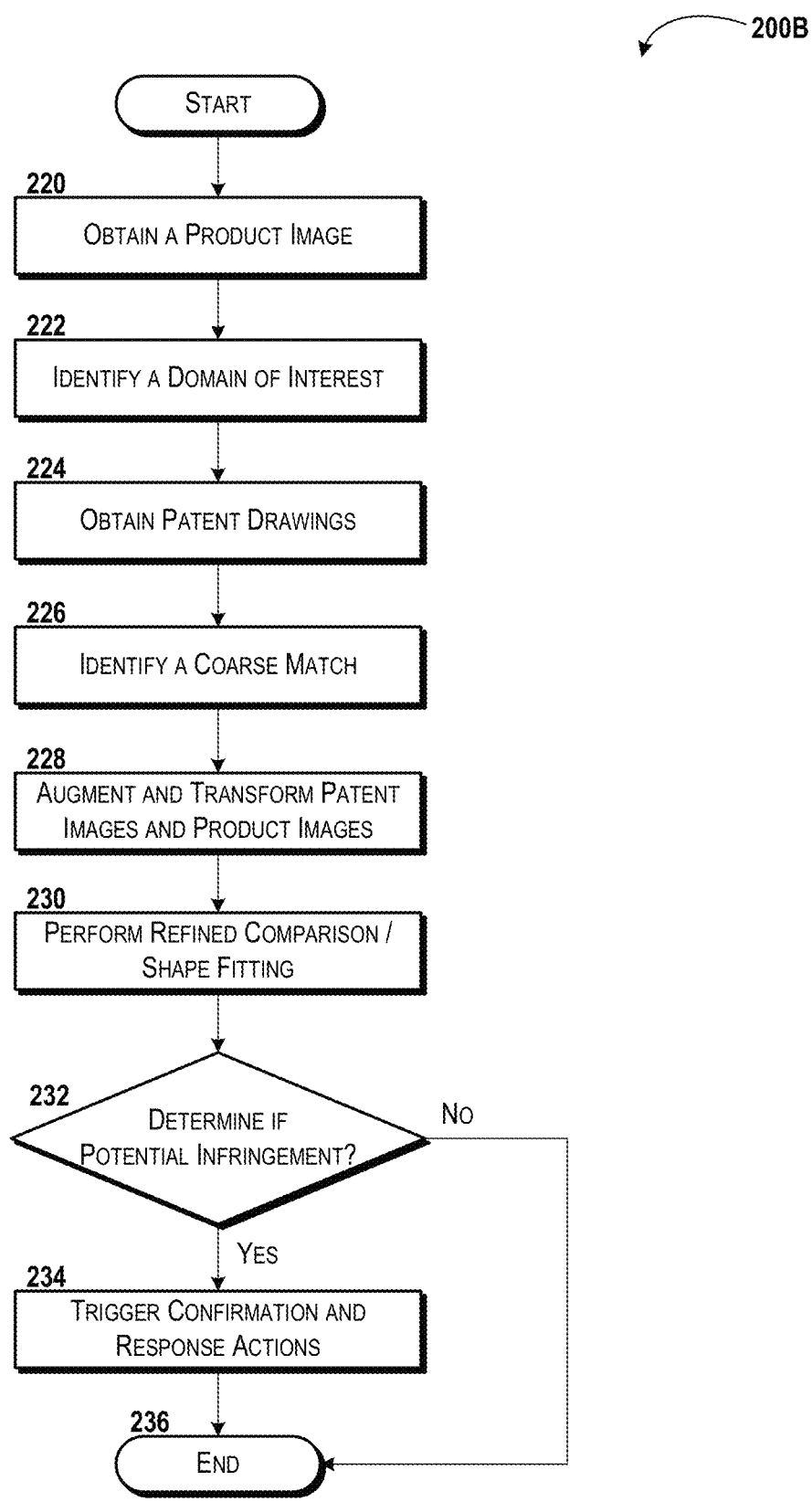
FIG. 2B is a flow diagram showing aspects of a method for identifying a potentially infringing product using an infringement detection system, according to another illustrative embodiment of the concepts and technologies described herein.

Turning now to FIG. 2B, aspects of a method 200B for identifying a potentially infringing product using an infringement detection system 102 will be described in detail, according to another illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, wearable devices, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the infringement detection system 102, to perform one or more operations and/or causing the processor to direct other components of the computing system or device to perform one or more of the operations.

For purposes of illustrating and describing the concepts of the present disclosure, the method 200B is described herein as being performed by the infringement detection system 102 via execution of one or more software modules such as, for example, the infringement detection application 108. It should be understood that additional and/or alternative devices and/or network nodes can provide the functionality described herein via execution of one or more modules, applications, and/or other software including, but not limited to, the infringement detection application 108. Thus, the illustrated embodiments are illustrative, and should not be viewed as being limiting in any way.

The method 200B begins at operation 220. At operation 220, the infringement detection system 102 can obtain a product image 110. The infringement detection system 102 can obtain one or more product image 110 from one or more product image sources 112, as explained above. In one contemplated embodiment, the product image 110 obtained in operation 220 can correspond to photograph taken with a camera, a scan obtained by a luggage or body scanner, or other product image source 112 as illustrated and described herein. Thus, some embodiments of the method 200B can use a product image 110 as an original input. It should be understood that this example is illustrative, and therefore should not be construed as being limiting in any way. As explained above, the product image sources 112 illustrated and described herein can include a computerized image generation source such as, for example, a generative neural network, a CAD model, a LIDAR image capture, a video gaming world, a scanner (e.g., X-ray, CT, CAT, MRI, etc.), combinations thereof, or the like. Additionally, or alternatively, the product image sources 112 illustrated and described herein can include an image supply source such as, for example, document image collections; collectible image collections; Internet web sites (e.g., Internet addresses of web site pages or marketplaces that promote and/or offer products and content for sale, social media, search engines, websites; photo, video and animation databases, or the like); or other sources. Thus, obtaining the product image 110 can include receiving output from various computing environments, services, devices, systems, or the like.

From operation 220, the method 200B can proceed to operation 222. At operation 222, the infringement detection system 102 can identify a domain of interest associated with the product image 110. According to various embodiments of the concepts and technologies disclosed herein, the infringement detection system 102 can be configured to provide a portal and/or other functionality to enable a user or other entity to interact with the infringement detection system 102 to specify a domain of interest (e.g., a user or operator could photograph a shoe and input, through the portal or other functionality, the word "shoe" as the domain of interest). It should be understood that this example is illustrative, and therefore should not be construed as being limiting in any way. In some other embodiments, the infringement detection system 102 can be configured to receive or otherwise obtain an indication of product or product type and the infringement detection system 102 can determine, based on the indication and/or based on the product or product type, the domain of interest. In yet other embodiments, the infringement detection system 102 can use object detection, image matching, and/or other analysis to determine a domain of interest. Because the domain of interest can be determined in various manners as illustrated and described herein, it should be understood that the above examples are illustrative and should not be construed as being limiting in any way.

From operation 222, the method 200B can proceed to operation 224. At operation 224, the infringement detection system 102 can obtain one or more patent drawings 122 that potentially are infringed by a product represented by the product image 110 obtained in operation 220. The infringement detection system 102 can obtain the patent drawings 122 from the patent data sources 118 by way of the infringement detection system 102 sending, to the one or more patent data sources 118, one or more patent data requests 120 and/or in other manners as illustrated and described herein. As noted above, the one or more patent data requests 120 can include and/or can specify the domain of interest identified in operation 222, in some embodiments. The patent data sources 118 can contain any reference set of images owned by a rights-controlling party such as, for example, patent drawings 122 for a particular patent, trade dress drawings for a particular trade dress registration, mask works, or the like. In some embodiments, a patent, trademark, copyright or design corpus from a rights-granting authority can correspond to one or more of the patent data sources 118 and therefore can be the source of the patent drawings 122 (or other intellectual property right drawings or images as illustrated and described herein).

From operation 224, the method 200B can proceed to operation 226. At operation 226, the infringement detection system 102 can identify a coarse match (e.g., an optimal match) using the one or more product images 110 and the one or more patent drawings 122. The coarse matching of operation 226 can be substantially similar to the coarse matching illustrated and described above with reference to operation 224 of the method 200A.

From operation 226, the method 200B can proceed to operation 228. At operation 228, the infringement detection system 102 can augment and/or transform the patent drawings 122 and the product images 110. The image augmentation and/or transformation of operation 228 can be substantially similar to the image augmentation and/or transformation illustrated and described above with reference to operation 208 of the method 200A.

From operation 228, the method 200B can proceed to operation 230. At operation 230, the infringement detection system 102 can perform a refined comparison operation, which can include the shape fitting analyses as illustrated and described herein. As explained above, operation 230 can correspond to the infringement detection system 102 determining if the optimal match (coarse match) identified in operation 226 remains the optimal match after the refined comparison illustrated and described herein. In operation 230, the infringement detection system 102 can compare the one or more patent drawing 122 (augmented or not) and the transformed product images 110 to one another to determine if a match exists. The refined comparison of operation 230 can be substantially similar to the refined comparison illustrated and described above with reference to operation 210 of the method 200A and/or the shape fitting illustrated and described above with reference to operation 212 of the method 200A.

From operation 230, the method 200B can proceed to operation 232. At operation 232, the infringement detection system 102 can determine, based on the refined comparison and shape fitting analyses illustrated and described above, if a potential infringement exists, e.g., if the product depicted in the transformed product image 110 potentially infringes a patent represented by the augmented patent drawings 122. In operation 232, then, the infringement detection system 102 can determine if the optimal match identified in the coarse match stage can still be determined (e.g., quantified) as still be optimal after a shape fitting analysis and/or other refined comparison. The determination of operation 232 can be substantially similar to the determination illustrated and described above with reference to operation 214 of the method 200A.

If the infringement detection system 102 determines, in operation 232, that a potential infringement does exist, the method 200B can proceed to operation 234. At operation 234, the infringement detection system 102 can trigger confirmation and response actions. The triggering of confirmation and response actions of operation 234 can be substantially similar to triggering confirmation and response actions as illustrated and described above with reference to operation 216 of the method 200A.

From operation 234, the method 200B can proceed to operation 236. The method 200B also can proceed to operation 236 from operation 232 if the infringement detection system 102 determines, in operation 232, that a potential infringement does not exist. The method 200B can end at operation 236. While the above methods 200A, 200B have been described as comparing augmented and/or transformed product images 110 to augmented and/or transformed patent drawings 122, it should be understood that in various embodiments of the concepts and technologies disclosed herein, the patent drawings 122 may not be augmented and/or transformed. Rather, the patent drawings 122 may be compared to augmented and/or transformed product images 110 without any modifications to the patent drawings 122. As such, the above example embodiments should not be construed as being limiting in any way.

Figure 4:
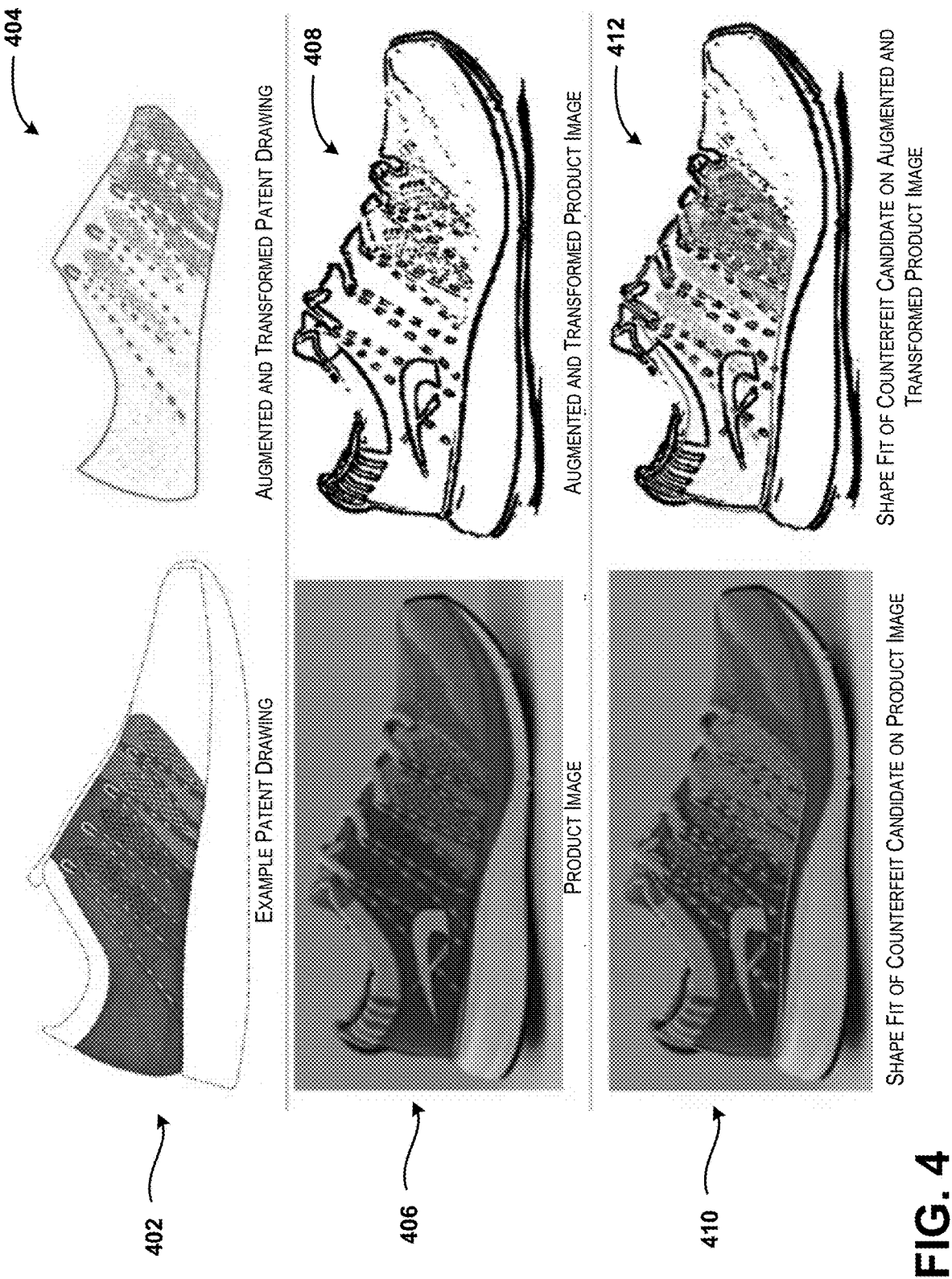
FIG. 4 illustrates some example images, according to an illustrative embodiment of the concepts and technologies disclosed herein.

Turning now to FIG. 4, some example images are shown. In particular, FIG. 4 illustrates an example patent drawing 402, an example augmented and transformed version of the patent drawing 404, an example product image 406, an example augmented and transformed version of the product image 408, an image 410 illustrating a shape fitting of a counterfeit candidate (e.g., the augmented and transformed patent drawing 404) on the example product image 406, and an image 412 illustrating a shape fitting of a counterfeit candidate (e.g., the augmented and transformed patent drawing 404) on the example augmented and transformed product image 408. The example images shown in FIG. 4 are provided for illustration of various aspects of the concepts and technologies disclosed herein and should not be construed as being limiting in any way.

Figure 5:
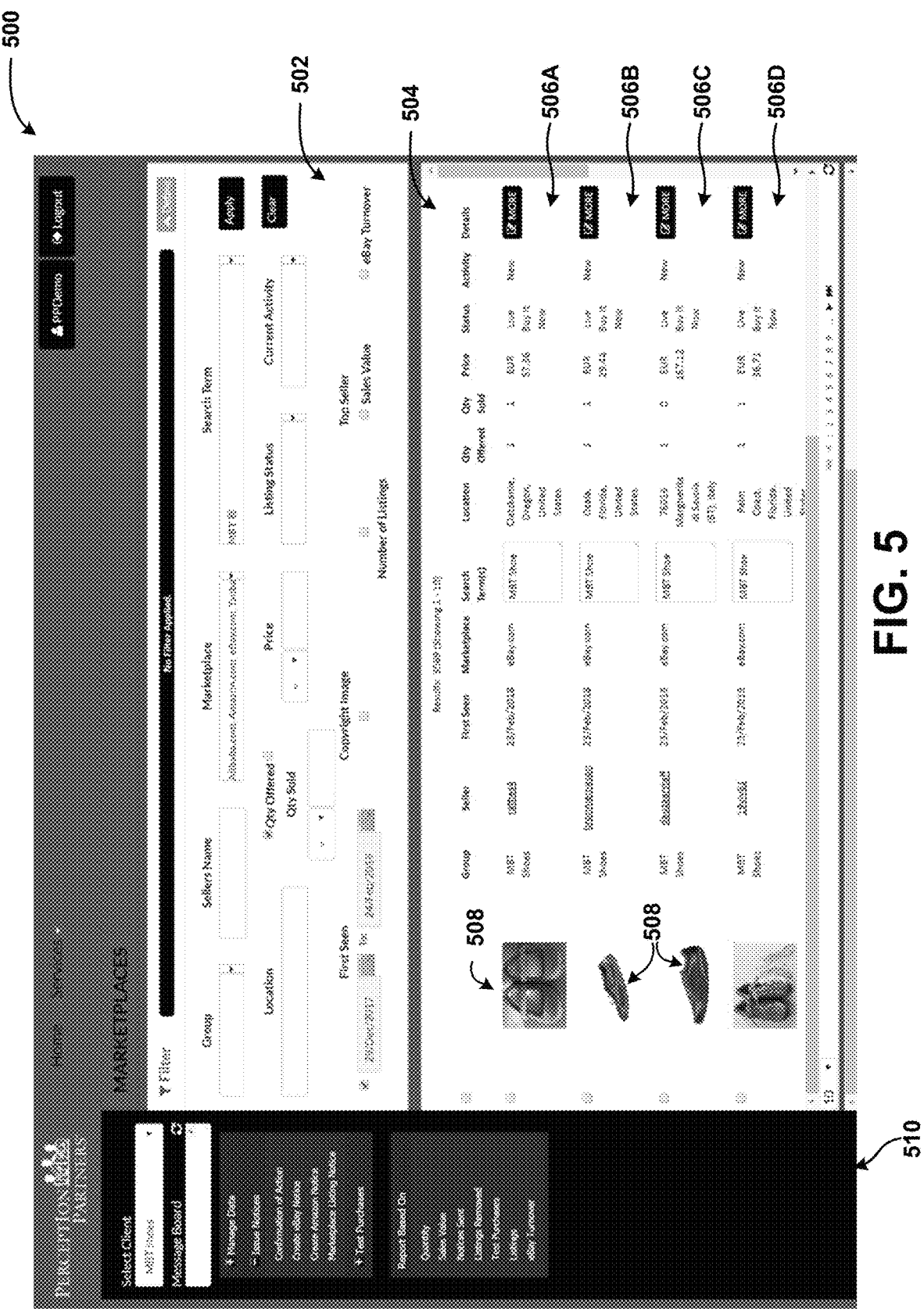
FIG. 5 is a user interface diagram showing an example screen display for interacting with and/or using an infringement detection system, according to some illustrative embodiments of the concepts and technologies described herein.

FIG. 5 is a user interface ("UI") diagram showing aspects of a UI for using and/or interacting with the infringement detection system 102, according to some illustrative embodiments of the concepts and technologies disclosed herein. FIG. 5 shows an illustrative screen display 500. According to some embodiments of the concepts and technologies described herein, the screen display 500 can be generated by the infringement detection system 102 and/or the infringement detection application 108. In particular, according to various embodiments, the screen display 500 and/or other screen displays can be generated in conjunction with and/or based upon interactions with the infringement detection application 108 described herein, which can be configured to render the screen display 500 using data generated at the infringement detection system 102 and/or using data provided by the infringement detection system 102. It should be appreciated that the UI diagram illustrated in FIG. 5 is illustrative of one contemplated example of the UIs that can be generated and/or displayed in accordance with the concepts and technologies disclosed herein, and therefore should not be construed as being limiting in any way.

According to various embodiments, the screen display 500 can be presented, for example, when a user or other entity requests a report of potential infringement, when a user or other entity executes a check of a particular patent number, and/or at other times. Because the screen display 500 illustrated in FIG. 5 can be displayed at additional and/or alternative times, it should be understood that these examples are illustrative and therefore should not be construed as being limiting in any way.

The screen display 500 can include various menus and/or menu options (not shown in FIG. 5). The screen display 500 also can include a filter window 502. The filter window 502 can be used to create various search terms and/or to format a report and/or list that can be provided in a potential infringer view window 504. The potential infringer view window 504 can be configured to present one or more potential infringement matches 506A-D (hereinafter collectively and/or generically referred to as "potential infringement matches 506").

One or more of the potential infringement matches 506 and/or the potential infringer view window 504 can present various types of information associated with one or more potential infringers of a particular intellectual property asset such as, for example, a patent. Thus, as shown in FIG. 5, one or more of the potential infringement matches 506 can include a thumbnail image 508, which can correspond to one or more product images 110 and various types of information associated with a seller or retailer offering the possibly infringing product represented by the thumbnail image 508. Thus, for example, one or more of the potential infringement matches 506 can include seller information, a first seen date that can indicate the first date on which this product was offered for sale by the seller, a marketplace on which the sale was identified, search terms, a geographic location associated with the product and/or seller, a quantity of the product being offered, a quantity of the product that has been sold, a price at which the product is offered, a status of the sale of the product, activity information associated with the sale of the product and/or the seller, a link to details and/or other detailed information, other information, combinations thereof, or the like.

The screen display 500 also can include a menu area 510, which can include a number of actions that can be available. It can be appreciated that the menu area 510 shown in FIG. 5 includes options for various response actions as illustrated and described herein. It should be understood that this example is illustrative, and therefore should not be construed as being limiting in any way. Because additional or alternative controls can be included in the screen display 500, it should be understood that the example embodiment shown in FIG. 5 is illustrative and therefore should not be construed as being limiting in any way.

Figure 6:
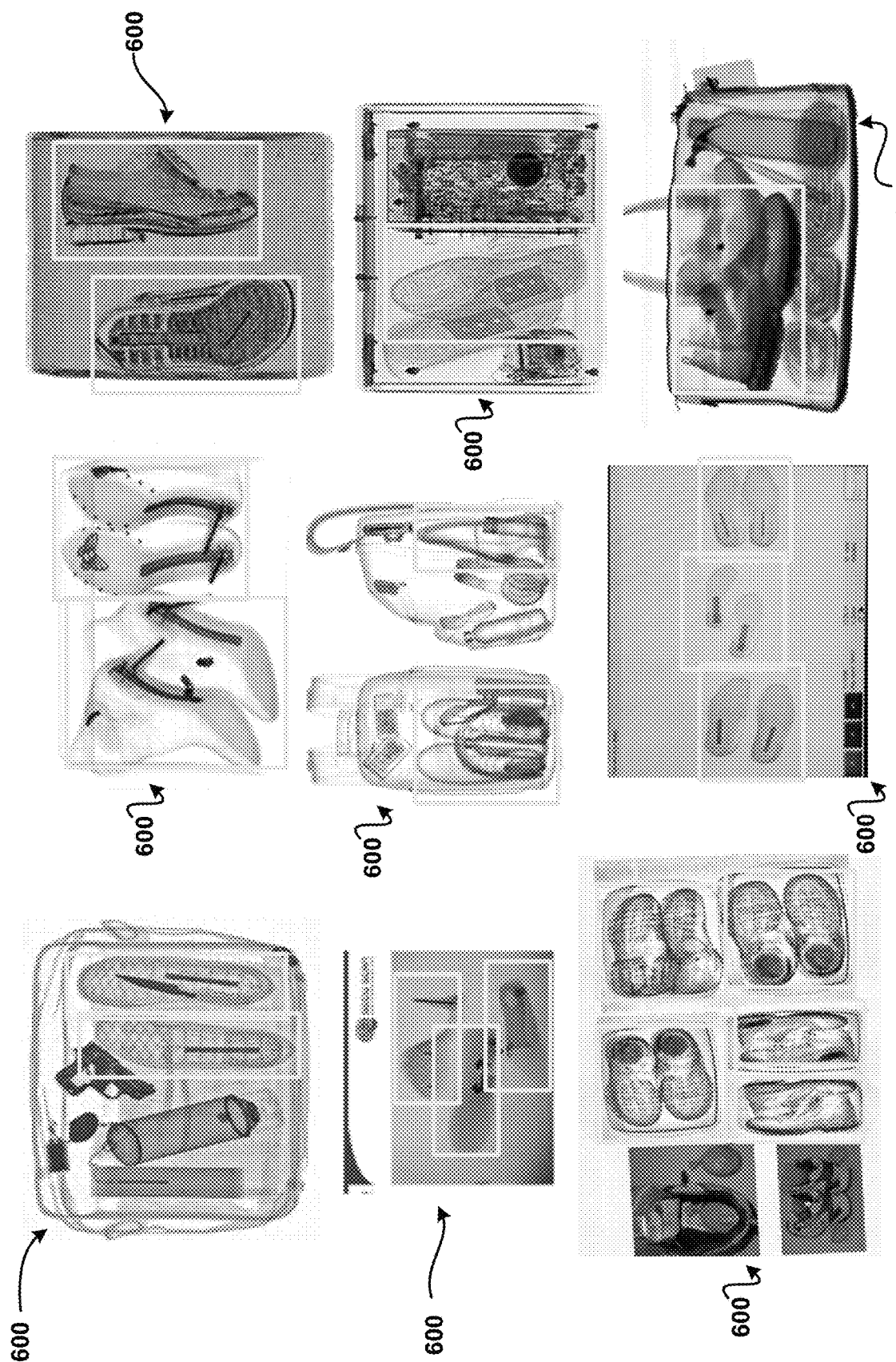
FIG. 6 illustrates some example product images and/or overlays of product images and patent drawings, according to some illustrative embodiments of the concepts and technologies disclosed herein.

Turning now to FIG. 6, additional aspects of the infringement detection system 102 will be illustrated and described. In particular, FIG. 6 illustrates example images 600. The example images 600 illustrate images from an x-ray system (e.g., a luggage scanner at an airport, a container scanner at a port, or the like). As explained above, various embodiments of the concepts and technologies disclosed herein can include obtaining the product images 110 from a camera, scanner, video, or other source. Thus, images can be scanned by the infringement detection system 102 to determine if any objects in the images are potentially infringing. Thus, embodiments of the concepts and technologies disclosed herein can be used to scan at ports or other locations to detect pirated goods, for example. It should be understood that this example is illustrative, and therefore should not be construed as being limiting in any way.

Figure 7:
FIG. 7 is an image illustrating an example source of a product image and schematically illustrates a potential infringement, according to an illustrative embodiment of the concepts and technologies disclosed herein.

Turning now to FIG. 7, additional aspects of the infringement detection system 102 will be illustrated and described. In particular, FIG. 7 illustrates an example of detecting possibly infringing products in a video stream or other type of imagery (e.g., a photograph). The example shows a phone in a video frame, where the phone is determined by the infringement detection system 102 to potentially infringe a design patent. It should be understood that this example is illustrative, and therefore should not be construed as being limiting in any way.

While the above description has primarily discussed the comparison of patent drawings 122 to product images 110, it can be appreciated that the infringement detection system 102 and/or the functionality thereof can be extended to other use cases and/or can analyze and/or interact with other types of information. In particular, the concepts and technologies disclosed herein can be used to train the infringement detection system 102 to create imagery that does infringe a patent drawing 122 or that does not infringe a patent drawing 122. For example, an input to the infringement detection system 102 may include a design patent drawing, and the infringement detection system 102 can be configured to create a product (or create a product image 110) that does not infringe the patent drawing 122. Thus, the functionality illustrated and described herein with reference to the infringement detection system 102 can be used to create non-infringing products (e.g., instead of performing infringement searches and/or obtaining right-to-mark opinions, the infringement detection system 102 can be used to design non-infringing products). It should be understood that this example is illustrative, and therefore should not be construed as being limiting in any way.

Similarly, the functionality of the infringement detection system 102 illustrated and described herein can be used to predict products based on patents and/or patent drawings, sketches, and the like. Thus, for example, the infringement detection system 102 can be used for product development, in some embodiments. It should be understood that this example is illustrative, and therefore should not be construed as being limiting in any way. Also, the functionality of the infringement detection system 102 can be used to create two-and-a-half dimensional or three dimensional models (as noted above) from patent drawings 122 or other reference images. The three dimensional models can be manipulated to match views shown in product images 110, in some embodiments, to further improve the analysis illustrated and described herein. Thus, for example, a patent drawing 122 can be used to create a two-and-a-half dimensional shading map or texture map or three dimensional mesh or point cloud that can be manipulated to approximate a view shown in a product image 110. By way of example, a scan of luggage may show the top of a shoe, but a patent drawing 122 may show a side elevation view of a shoe that is patented. The infringement detection system 102 can be configured, in various embodiments of the concepts and technologies disclosed herein, to create a three dimensional mesh of the shoe shown in the patent drawing 122, and to manipulate the created solid or model to approximate the shoe shown in a scan or other output from the scan of the luggage (e.g., to the bottom of the shoe). The resulting view can be compared to the product image 110. The three dimensional modeling can be used for other purposes, so the above example is illustrative and should not be construed as being limiting in any way.

In some embodiments of the concepts and technologies disclosed herein, the infringement detection system 102 can be used for detecting medical implants and/or other foreign bodies in a human. For example, an imaging device can be configured to identify a medical instrument, implant, or other entity (e.g., in a body). An image of the entity can then be used as the product image 110 illustrated and described herein, and the entity can be identified based on patent information and/or other databases or libraries of, for example, medical implants, medical instruments, or the like. In one contemplated use case, a scan of a human can be analyzed, a tool can be identified in the image, and identified using the infringement detection system 102 illustrated and described herein. In some instances, this technology can be used to identify malpractice (e.g., a left tool from a surgery, etc.). In some other instances, this technology can be used for passenger screening and/or other anti-terror purposes (e.g., to scan passengers for implanted bombs, or the like). It should be understood that these examples are illustrative, and therefore should not be construed as being limiting in any way.

In some embodiments of the concepts and technologies disclosed herein, the infringement detection system 102 can be used for detecting infringement of semiconductors (e.g., mask works). For example, an imaging device can be configured to identify a semiconductor device or other entity (e.g., in a product, in luggage, in a storage container, etc.). An image of the entity can then be used as the product image 110 illustrated and described herein, and the entity can be identified based on mask works, copyright registrations, patents, and/or other information. Thus, a scan of a product can reveal a potential infringement of an intellectual property asset associated with a semiconductor, in some embodiments. It should be understood that these examples are illustrative, and therefore should not be construed as being limiting in any way.

It can be appreciated from the above description that the infringement detection system 102 can operate, in some embodiments, as a search engine that can use a product image 110 as a reference for a search, where the search can be executed against various intellectual property image sources (e.g., the patent data sources 118 illustrated and described herein), and that among the returned results, the infringement detection system 102 can find an optimal match (coarse match) among the first set of results and perform the refined comparison to output a result that is still deemed optimal after the refined comparison. Thus, in some embodiments the infringement detection system 102 can perform image retrieval (e.g., obtaining product images 110 and/or obtaining patent drawings 122) based on a sketch, photo, or other type of image. In some embodiments, the infringement detection system 102 can perform a variation of sketch-based image retrieval and comparison across two domains, where the first domain of the cross-domain comparison can correspond to sketches (e.g., the patent drawings 122) and the second domain can correspond to photographs (e.g., the product images 110). The cross-domain image retrieval illustrated and described herein can find not only broad similarity between images (e.g., in the coarse matching stage) to detect one or more possibly optimal matches in retrieved images (e.g., patent drawings 122) and a reference image (e.g., the product image 110), but also fine-grained similarity (e.g., in the refined comparison stage) to verify that one or more of the possibly optimal matches remains optimal after the refined comparison. It should be understood that this example is illustrative, and therefore should not be construed as being limiting in any way.

According to various embodiments of the concepts and technologies disclosed herein, the infringement detection system 102 can learn a shared embedding for patent drawings 122 and product images 110 such that distances in the learned space are related to structural and/or semantic similarly between the patent drawings 122 and the product images 110. This approach can take into account multiple levels of similarity including, for example, a category level similarity (e.g., the product image 110 relates to a shoe and the patent drawing 122 relates to a shoe), as well as an instance level similarity that can determine similarity between the patent drawing 122 and product image 110. It should be understood that this example is illustrative, and therefore should not be construed as being limiting in any way.

The above description has used the terms "transform," "augment," and variations thereof. For purposes of the claims and description, the word "augment" can be used to refer to modifying an image (e.g., the product image 110 or the patent drawing 122), adding matter to the image (e.g., the product image 110 or the patent drawing 122), subtracting matter from the image (e.g., the product image 110 or the patent drawing 122), and/or otherwise modifying the images in any manner as illustrated and described herein. As such, the word "augment" does not necessarily require matter to be added to an image, for purposes of the specification and the claims.

Figure 8:
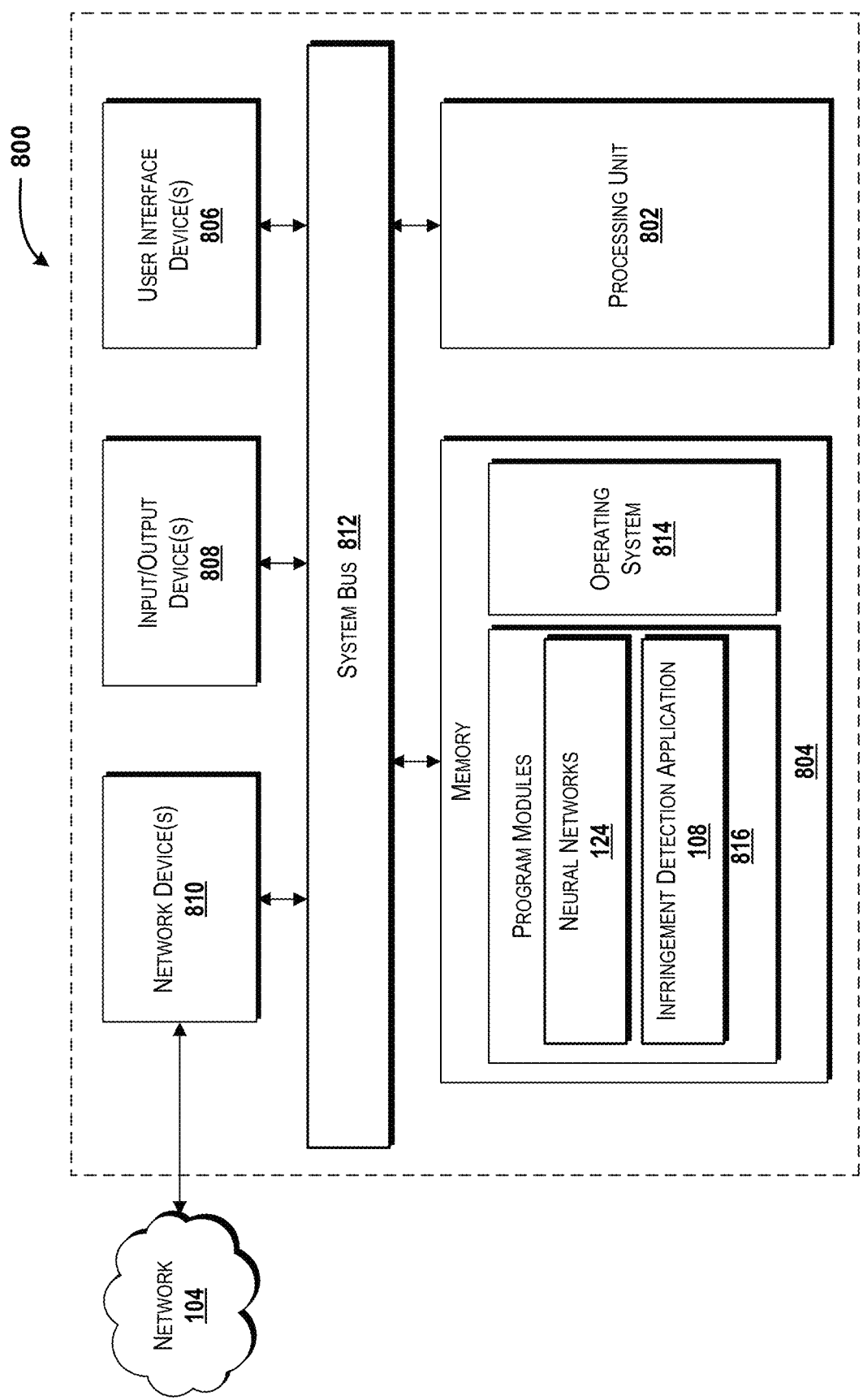
FIG. 8 is a block diagram illustrating an example computer system capable of implementing aspects of the concepts and technologies disclosed herein, according to some illustrative embodiments of the concepts and technologies described herein.

FIG. 8 is a block diagram illustrating a computer system 800 that can be configured to provide the functionality described herein for the infringement detection system 102 and/or other computing devices, in accordance with various embodiments of the concepts and technologies disclosed herein. The computer system 800 includes a processing unit 802, a memory 804, one or more user interface devices 806, one or more input/output ("I/O") devices 808, and one or more network devices 810, each of which is operatively connected to a system bus 812. The bus 812 enables bi-directional communication between the processing unit 802, the memory 804, the user interface devices 806, the I/O devices 808, and the network devices 810.

The processing unit 802 may be a standard central processor that performs arithmetic and logical operations, a more specific purpose programmable logic controller ("PLC"), a programmable gate array, or other type of processor known to those skilled in the art and suitable for controlling the operation of the computer system 800. As used herein, the word "processor" and/or the phrase "processing unit" when used with regard to the computer system 800 can include multiple processors or processing units distributed across and/or operating in parallel in a single machine or in multiple machines. Furthermore, processors and/or processing units can be used to support virtual processing environments. Because processors and/or processing units are generally known, the processors and processing units disclosed herein will not be described in further detail herein.

The memory 804 can communicate with the processing unit 802 via the system bus 812. In some embodiments, the memory 804 is operatively connected to a memory controller (not shown) that enables communication with the processing unit 802 via the system bus 812. The memory 804 includes an operating system 814 and one or more program modules 816. The operating system 814 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 816 may include various software and/or program modules described herein. In some embodiments, for example, the program modules 816 include the operating system 106 and the infringement detection application 108. These and/or other programs can be embodied in computer-readable media containing instructions that, when executed by the processing unit 802, perform the methods 200A, 200B illustrated and described in detail above with respect to FIG. 2A and/or other functionality as illustrated and described herein. It can be appreciated that, at least by virtue of the instructions embodying the methods 200A and/or other functionality illustrated and described herein being stored in the memory 804 and/or accessed and/or executed by the processing unit 802, the computer system 800 can be transformed into a special-purpose computing system that can facilitate providing the functionality illustrated and described herein for detecting potential infringers. According to embodiments, the program modules 816 may be embodied in hardware, software, firmware, or any combination thereof. Although not shown in FIG. 8, it should be understood that the memory 804 also can be configured to store the product images 110, the patent data 116, the output 130, and/or other data as described herein, if desired.

By way of example, and not limitation, computer-readable media may include any available computer storage media or communication media that can be accessed by the computer system 800. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 800. In the claims, the phrase "computer storage medium" and variations thereof does not include waves or signals per se and/or communication media as defined herein.

The user interface devices 806 may include one or more devices with which a user accesses the computer system 800. The user interface devices 806 may include, but are not limited to, computers, servers, personal digital assistants, cellular phones, or any suitable computing devices. The I/O devices 808 enable a user to interface with the program modules 816. In one embodiment, the I/O devices 808 are operatively connected to an I/O controller (not shown) that enables communication with the processing unit 802 via the system bus 812. The I/O devices 808 may include one or more input devices, such as, but not limited to, a keyboard, a mouse, haptic device, gestural device, or an electronic stylus. Further, the I/O devices 808 may include one or more output devices, such as, but not limited to, a display screen or a printer.

The network devices 810 enable the computer system 800 to communicate with other networks or remote systems via a network, such as the network 104. Examples of the network devices 810 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 9:
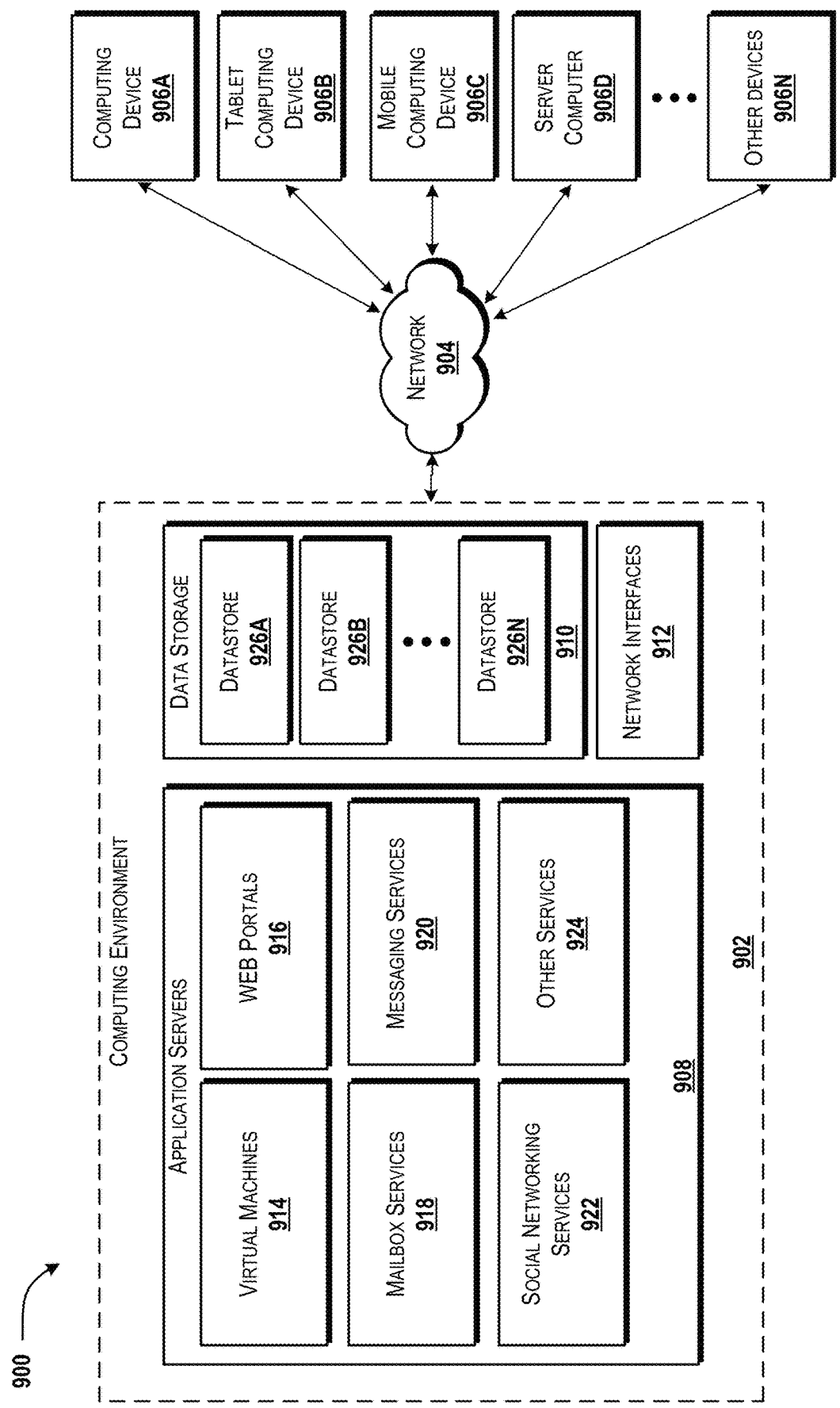
FIG. 9 is a diagram illustrating a computing environment capable of implementing aspects of the concepts and technologies disclosed herein, according to some illustrative embodiments of the concepts and technologies described herein.

FIG. 9 illustrates an illustrative distributed computing environment 900 capable of executing the software components described herein for providing an infringement detection system 102. Thus, the distributed computing environment 900 illustrated in FIG. 9 can be used to provide the functionality described herein with respect to the infringement detection system 102. The distributed computing environment 900 thus may be utilized to execute any aspects of the software components presented herein.

According to various implementations, the distributed computing environment 900 includes a computing environment 902 operating on, in communication with, or as part of the network 904. The network 904 also can include various access networks. According to various embodiments of the concepts and technologies disclosed herein, the functionality of the network 904 can be provided by the network 104 illustrated in FIG. 1. One or more client devices 906A-906N (hereinafter referred to collectively and/or generically as "clients 906") can communicate with the computing environment 902 via the network 904 and/or other connections (not illustrated in FIG. 9). In the illustrated embodiment, the clients 906 include a computing device 906A such as a laptop computer, a desktop computer, or other computing device; a slate or tablet computing device ("tablet computing device") 906B; a mobile computing device 906C such as a mobile telephone, a smart phone, or other mobile computing device; a server computer 906D; and/or other devices 906N. It should be understood that any number of clients 906 can communicate with the computing environment 902. It should be understood that the illustrated clients 906 and computing architectures illustrated and described herein are illustrative, and should not be construed as being limiting in any way.

In the illustrated embodiment, the computing environment 902 can include one or more application servers 908, one or more instances of data storage 910, and one or more network interfaces 912. According to various implementations, the functionality of the application servers 908 can be provided by one or more server computers that can execute as a part of, or in communication with, the network 904. The application servers 908 can host various services, virtual machines, portals, and/or other resources. In the illustrated embodiment, the application servers 908 can host one or more virtual machines 914 for hosting applications, services, modules, or other functionality. According to various implementations, the virtual machines 914 can host one or more applications and/or software modules for providing the functionality described herein for tag-based security policy creation in a distributed computing environment. It should be understood that this embodiment is illustrative, and should not be construed as being limiting in any way. The application servers 908 also can host or can provide access to one or more Web portals, one or more link pages, one or more Web sites, and/or one or more other sources or access points to various types of information ("Web portals") 916.

According to various implementations, the application servers 908 also include one or more mailbox services 918 and one or more messaging services 920. The mailbox services 918 can include electronic mail ("email") services. The mailbox services 918 also can include various personal information management ("PIM") services including, but not limited to, calendar services, contact management services, collaboration services, and/or other services. The messaging services 920 can include, but are not limited to, instant messaging services, chat services, forum services, and/or other communication services.

The application servers 908 also can include one or more social networking services 922. The social networking services 922 can include various social networking services including, but not limited to, services for sharing or posting status updates, instant messages, links, photos, videos, and/or other information; services for commenting or displaying interest in articles, products, blogs, or other resources; and/or other services. In some embodiments, the social networking services 922 are provided by or include the FACEBOOK social networking service, the LINKEDIN professional networking service, the MYSPACE social networking service, the FOURSQUARE geographic networking service, the YAMMER office colleague networking service, and the like. In other embodiments, the social networking services 922 are provided by other services, sites, and/or providers that may or may not explicitly be known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Washington. Other services are possible and are contemplated.

The social networking services 922 also can include commenting, blogging, and/or microblogging services. Examples of such services include, but are not limited to, the YELP commenting service, the KUDZU review service, the OFFICETALK enterprise microblogging service, the TWITTER messaging service, the GOOGLE BUZZ service, and/or other services. It should be appreciated that the above lists of services are not exhaustive and that numerous additional and/or alternative social networking services 922 are not mentioned herein for the sake of brevity. As such, the above embodiments are illustrative, and should not be construed as being limiting in any way.

As shown in FIG. 9, the application servers 908 also can host other services, applications, portals, and/or other resources ("other resources") 924. It thus can be appreciated that the computing environment 902 can provide integration of the concepts and technologies disclosed herein provided herein for an infringement detection system 102 with various mailbox, messaging, social networking, and/or other services or resources, as illustrated and described above, particularly with reference to the response actions. For example, the concepts and technologies disclosed herein can be used to generate the email messages that report potential infringements or the like. Because the creation of messages and/or mail items is optional, it should be understood that this example is illustrative, and therefore should not be construed as being limiting in any way.

As mentioned above, the computing environment 902 can include the data storage 910. According to various implementations, the functionality of the data storage 910 is provided by one or more databases operating on, or in communication with, the network 904. The functionality of the data storage 910 also can be provided by one or more server computers configured to host data for the computing environment 902. The data storage 910 can include, host, or provide one or more real or virtual data stores 926A-926N (hereinafter referred to collectively and/or generically as "data stores 926"). The data stores 926 are configured to host data used or created by the application servers 908 and/or other data. Although not illustrated in FIG. 9, it should be understood that the data stores 926 also can host or store the various data illustrated and described herein including, but not limited to, the product images 110, the product image request 114, the patent data 116, the patent data request 120, the output 130, other data, and/or the like.

The computing environment 902 can communicate with, can communicate via, and/or can be accessed by, the network interfaces 912. The network interfaces 912 can include various types of network hardware and/or software (virtual and/or physical) for supporting communications between two or more computing devices including, but not limited to, the clients 906 and the application servers 908. It should be appreciated that the network interfaces 912 also may be utilized to connect to other types of networks and/or computer systems.

It should be understood that the distributed computing environment 900 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 900 provides the software functionality described herein as a service to one or more of the clients 906. It should be understood that the clients 906 can include real or virtual machines including, but not limited to, server computers, web servers, personal computers, mobile computing devices, smart phones, and/or other devices. As such, various embodiments of the concepts and technologies disclosed herein enable any device configured to access the distributed computing environment 900 to utilize the functionality described herein for an infringement detection system.

Based on the foregoing, it should be appreciated that systems and methods for providing an infringement detection system have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
a processor;
an imaging device; and
a memory that stores computer-executable instructions that, when executed by the processor, cause the processor to perform operations comprising
  obtaining, using the imaging device, a product image comprising an image of a product,
  identifying, based on received input that relates to the product image, a domain of interest associated with the product, wherein the domain of interest comprises a product type for the product,
  determining, based on the domain of interest, a patent classification associated with the product type, the patent classification comprising a class and a subclass,
  obtaining, from a patent database, a patent comprising patent drawings, wherein the patent is identified from a plurality of patents in the class and the subclass,
  identifying, from the patent drawings and using a neural network, a coarse match comprising an image pair including the product image and a patent drawing of the patent drawings, wherein the patent drawing is predicted by the neural network as being the patent drawing most likely to be infringed by the product,
  applying an image modification operation to the product image of the coarse match to obtain an augmented product image associated with the product,
  performing a refined matching operation by performing a fitting operation on the patent drawing and the augmented product image,
  confirming, by analyzing output from the refined matching operation, that the patent drawing remains predicted and that the patent is predicted to be infringed by the product, and
  in response to confirming that the patent is predicted to be infringed by the product, triggering a response action.

2. A device comprising:
a processor; and
a memory that stores computer-executable instructions that, when executed by the processor, cause the processor to perform operations comprising
  obtaining, using an imaging device, a product image comprising an image of a product,
  identifying, based on received input, a domain of interest associated with the product, wherein the domain of interest comprises a product type for the product,
  determining, based on the domain of interest, a patent classification comprising a class and a subclass,
  obtaining, from a patent database, a patent comprising patent drawings, wherein the patent is identified from a plurality of patents in the class and the subclass,
  identifying, from the patent drawings and using a neural network, a coarse match comprising an image pair including the product image and a patent drawing of the patent drawings, wherein the patent drawing is predicted by the neural network as being the patent drawing most likely to be infringed by the product, applying an image modification operation to the product image of the coarse match to obtain an augmented product image associated with the product, performing a refined matching operation by performing a fitting operation on the patent drawing and the augmented product image, and confirming, by analyzing output from the refined matching operation, that the patent drawing remains predicted and that the patent is predicted to be infringed by the product.

3. The device of claim 2, wherein the computer-executable instructions, when executed by the processor, cause the processor to perform operations further comprising:
determining if an offer for sale associated with the product comprises a price that is below a minimum advertised price.

4. The device of claim 2, wherein the computer-executable instructions, when executed by the processor, cause the processor to perform operations further comprising:
determining if the patent is likely enforceable.

5. The device of claim 2, wherein the computer-executable instructions, when executed by the processor, cause the processor to perform operations further comprising:
generating a confidence score that indicates a degree of confidence that the product represented by the product image infringes the patent.

6. The device of claim 2, wherein the fitting operation comprises:
determining if the augmented product image matches the augmented patent drawing; and
outputting a value that represents results of the fitting operation.

7. The device of claim 2, wherein the computer-executable instructions, when executed by the processor, cause the processor to perform operations further comprising:
in response to a determination that the product image remains predicted, triggering a response action.

8. The device of claim 2, wherein the computer-executable instructions, when executed by the processor, cause the processor to perform operations further comprising:
in response to a determination that the product image remains predicted, performing a response action that comprises generating, by the processor, an official registration of intellectual property associated with the product image.

9. The device of claim 2, wherein the computer-executable instructions, when executed by the processor, cause the processor to perform operations further comprising:
in response to a determination that the product image remains predicted, creating, by the processor, a claim chart.

10. The device of claim 2, further comprising:
the imaging device, wherein the product image is obtained by capturing the image of the product using the imaging device.

11. The device of claim 2, wherein the image of the product is captured in a first format, and wherein the augmented product image is obtained in a second format.

12. The device of claim 2, wherein the product image is obtained from a website associated with a marketplace, and wherein the product is offered for sale on the website.

13. The device of claim 2, wherein the product image is obtained from an image database.

14. The device of claim 2, wherein the computer-executable instructions, when executed by the processor, cause the processor to perform operations further comprising:
generating output that indicates a degree of similarity between the patent drawing and the product image; and
sending the output to a recipient.

15. The device of claim 2, wherein the neural network comprises a siamese neural network that includes shared embedding using triplet loss.

16. The device of claim 2, wherein applying the image modification operation to the product image comprises:
transforming the product image using an edge detection algorithm and a thresholding algorithm to generate a transformed product image.

17. The device of claim 2, further comprising:
obtaining an augmented patent drawing; and
comparing the augmented product image to the augmented patent drawing to determine if the product image remains predicted, wherein obtaining the augmented patent drawing comprises obtaining a further patent drawing associated with the patent, and augmenting the patent drawing with the further patent drawing.

18. The device of claim 2, further comprising:
obtaining an augmented patent drawing; and
comparing the augmented product image to the augmented patent drawing to determine if the product image remains predicted, wherein obtaining the augmented patent drawing comprises removing, from the patent drawing, irrelevant matter.

19. The device of claim 18, wherein removing the irrelevant matter from the patent drawing comprises:
identifying, using a broken line detection algorithm, the irrelevant matter based on identifying a broken line in the patent drawing; and
removing, from the patent drawing, a portion of the patent drawing that is bound by the broken line.

20. A computer storage medium having computer-executable instructions stored thereon that, when executed by a processor, cause the processor to perform operations comprising:
obtaining, using an imaging device, a product image comprising an image of a product;
identifying, based on received input, a domain of interest associated with the product, wherein the domain of interest comprises a product type for the product;
determining, based on the domain of interest, a patent classification comprising a class and a subclass;
obtaining, from a patent database, a patent comprising patent drawings, wherein the patent is identified from a plurality of patents in the class and the subclass;
identifying, from the patent drawings and using a neural network, a coarse match comprising an image pair including the product image and a patent drawing of the patent drawings, wherein the patent drawing is predicted by the neural network as being the patent drawing most likely to be infringed by the product,
applying an image modification operation to the product image of the coarse match to obtain an augmented product image associated with the product;
performing a refined matching operation by performing a fitting operation on the patent drawing and the augmented product image; and
confirming, by analyzing output from the refined matching operation, that the patent drawing remains predicted and that the patent is predicted to be infringed by the product.

* * * * *